United States Patent
Lee et al.

(10) Patent No.: US 11,974,325 B2
(45) Date of Patent: Apr. 30, 2024

(54) METHOD FOR TRANSMITTING AND RECEIVING PHYSICAL RANDOM ACCESS CHANNEL PREAMBLE IN WIRELESS COMMUNICATION SYSTEM AND APPARATUS THEREFOR

(71) Applicant: LG ELECTRONICS INC., Seoul (KR)

(72) Inventors: Jeongsu Lee, Seoul (KR); Sukhyon Yoon, Seoul (KR); Hyunsoo Ko, Seoul (KR); Kijun Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 371 days.

(21) Appl. No.: 17/425,286

(22) PCT Filed: Jan. 30, 2020

(86) PCT No.: PCT/KR2020/001430
§ 371 (c)(1),
(2) Date: Jul. 22, 2021

(87) PCT Pub. No.: WO2020/159254
PCT Pub. Date: Aug. 6, 2020

(65) Prior Publication Data
US 2022/0124818 A1  Apr. 21, 2022

(30) Foreign Application Priority Data
Feb. 1, 2019  (KR) .................. 10-2019-0014024

(51) Int. Cl.
*H04W 74/08* (2009.01)
*H04W 74/0833* (2024.01)

(52) U.S. Cl.
CPC .............................. *H04W 74/0833* (2013.01)

(58) Field of Classification Search
CPC ..... H04W 74/08; H04W 74/00; H04W 74/06; H04W 74/0833; H04W 72/04;
(Continued)

(56) References Cited

U.S. PATENT DOCUMENTS 7,324,465 B2 * 1/2008 Lim .................. H04B 7/18558
370/347
10,433,291 B2 * 10/2019 Radulescu ........... H04B 17/318
(Continued)

FOREIGN PATENT DOCUMENTS

KR 10-2018-0116313 A  10/2018

OTHER PUBLICATIONS

CATT, "NR Power Control Framework", R1-1715838, 3GPP TSG RAN WG1 RAN1 NR AH#3, Nagoya, Japan, Sep. 18-21, 2017, See pp. 16-18.
(Continued)

*Primary Examiner* — Man U Phan
(74) *Attorney, Agent, or Firm* — BRYAN CAVE LEIGHTON PAISNER LLP

(57) ABSTRACT

Proposed is a method for transmitting a physical random access channel (PRACH) preamble in a wireless communication system. Specifically, a method performed by user equipment (UE) comprises the steps of: receiving, from a base station, setting information including a first power ramping step for a two-step random access channel (RACH) and a second power ramping step for a four-step RACH; transmitting, to the base station, information including a first preamble and a physical uplink shared channel (PUSCH) for a two-step RACH on the basis of the first power ramping step; and transmitting, to the base station, a second preamble for a four-step RACH by using the second power ramping step, on the basis of the number of retransmissions of the
(Continued)

information exceeding a maximum number of retransmissions associated with a preset two-step RACH.

18 Claims, 15 Drawing Sheets

(58) Field of Classification Search
CPC ..... H04W 72/20; H04W 52/36; H04W 52/50; H04W 28/18; H04W 72/14; H04W 24/08; H04W 76/27; H04W 52/34; H04W 24/10; H04W 72/12; H04L 1/00; H04L 5/00; H04L 5/0051; H04L 5/0055; H04L 5/10
USPC ........................................................ 370/329
See application file for complete search history.

(56) References Cited

U.S. PATENT DOCUMENTS

| | | | | |
|---|---|---|---|---|
| 10,433,342 | B2 * | 10/2019 | Akkarakaran | .... H04W 74/0833 |
| 10,506,605 | B2 * | 12/2019 | Lee | ........................ H04W 72/51 |
| 10,568,007 | B2 * | 2/2020 | Park | ........................ H04W 36/30 |
| 10,716,148 | B2 * | 7/2020 | Kim | .................... H04W 74/004 |
| 11,064,534 | B2 * | 7/2021 | Agiwal | .................. H04L 5/0048 |
| 11,129,201 | B2 * | 9/2021 | Martin | ............... H04W 74/0833 |
| 11,229,062 | B2 * | 1/2022 | Huang | ............... H04W 74/008 |
| 11,272,532 | B2 * | 3/2022 | Jeon | .................. H04W 72/0446 |
| 11,350,463 | B2 * | 5/2022 | Akkarakaran | ........ H04W 52/50 |
| 11,445,549 | B2 * | 9/2022 | Yerramalli | ............ H04W 52/50 |
| 11,540,323 | B2 * | 12/2022 | Xu | ........................ H04W 74/006 |
| 11,611,996 | B2 * | 3/2023 | Xiong | .................. H04W 74/006 |
| 11,647,543 | B2 * | 5/2023 | Dinan | ............... H04W 74/0833 370/329 |
| 11,653,390 | B2 * | 5/2023 | Martin | ............... H04W 74/0833 370/329 |
| 2018/0367255 | A1 | 12/2018 | Jeon et al. | |
| 2018/0376428 | A1 | 12/2018 | Lin et al. | |
| 2022/0183076 | A1 * | 6/2022 | Lee | ........................ H04W 52/16 |
| 2023/0269784 | A1 * | 8/2023 | Martin | ............... H04W 74/0833 370/329 |

OTHER PUBLICATIONS

Samsung, "4-step RACH procedure", R1-1707933, 3GPP TSG RAN WG1 Meeting #89, Hangzhou, China, May 15-19, 2017, See pp. 5-8.

* cited by examiner

[FIG. 1]
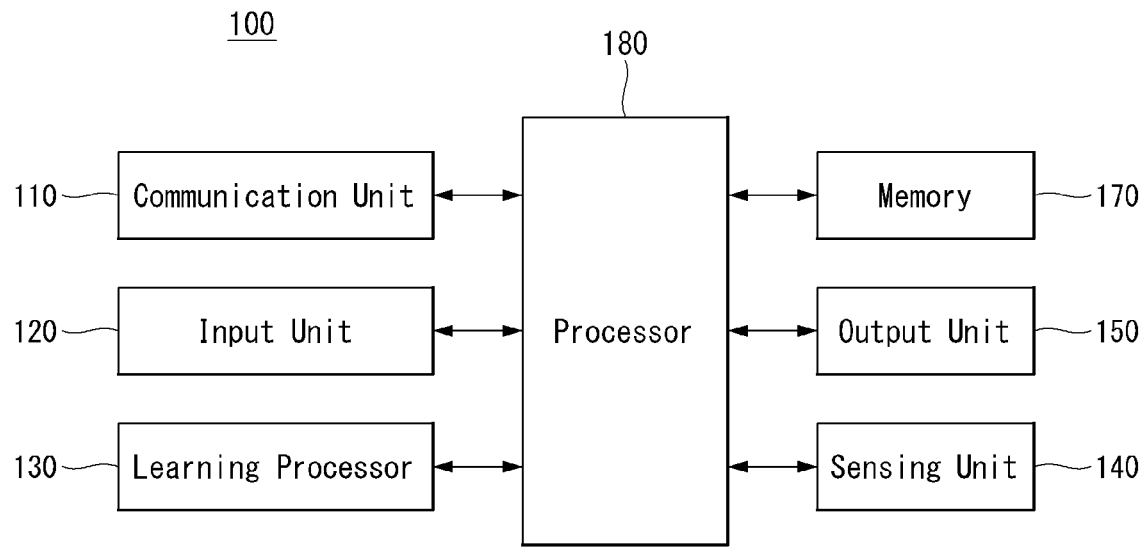
[FIG. 2]
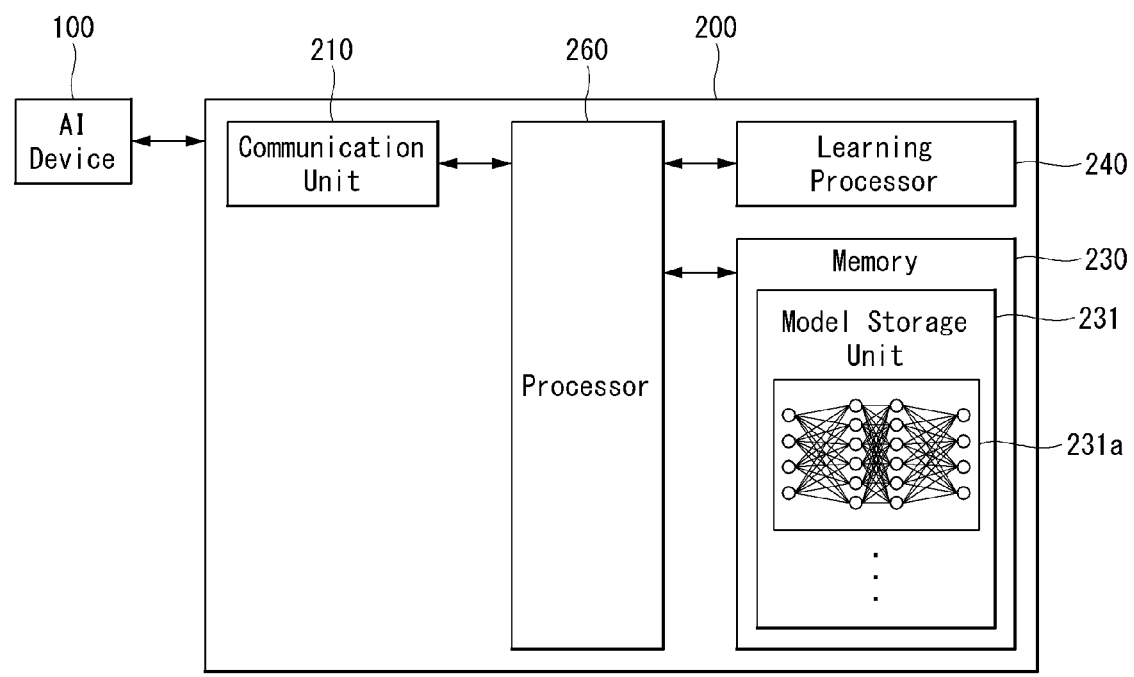

[FIG. 3]
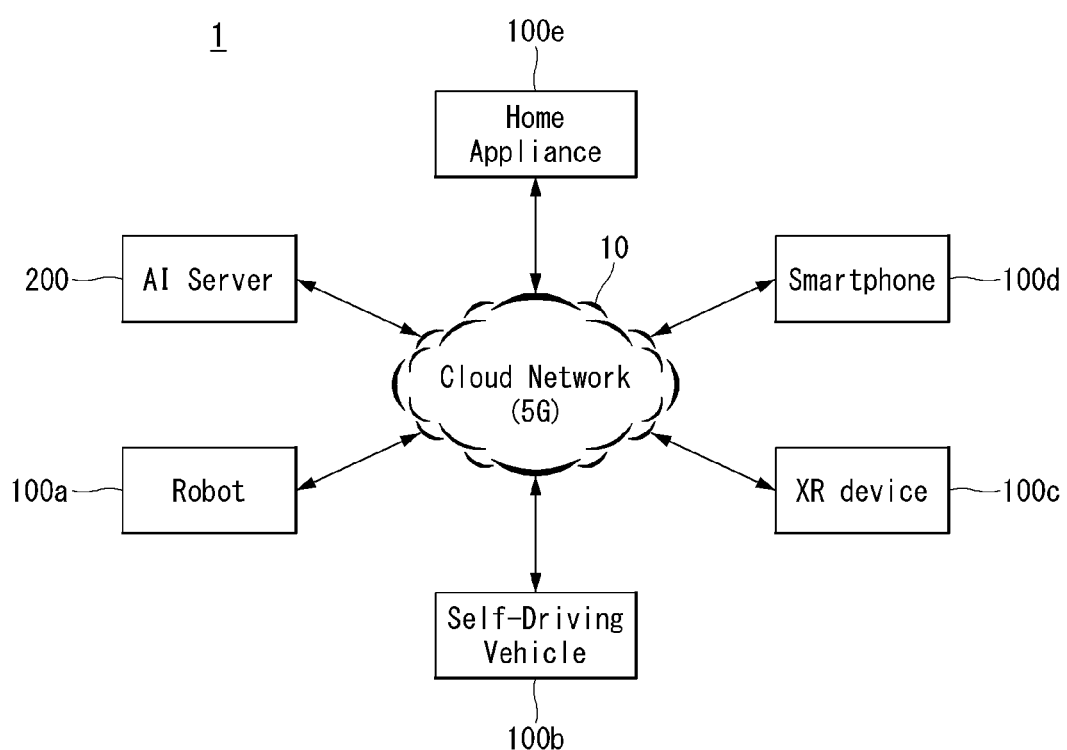

【FIG. 4】
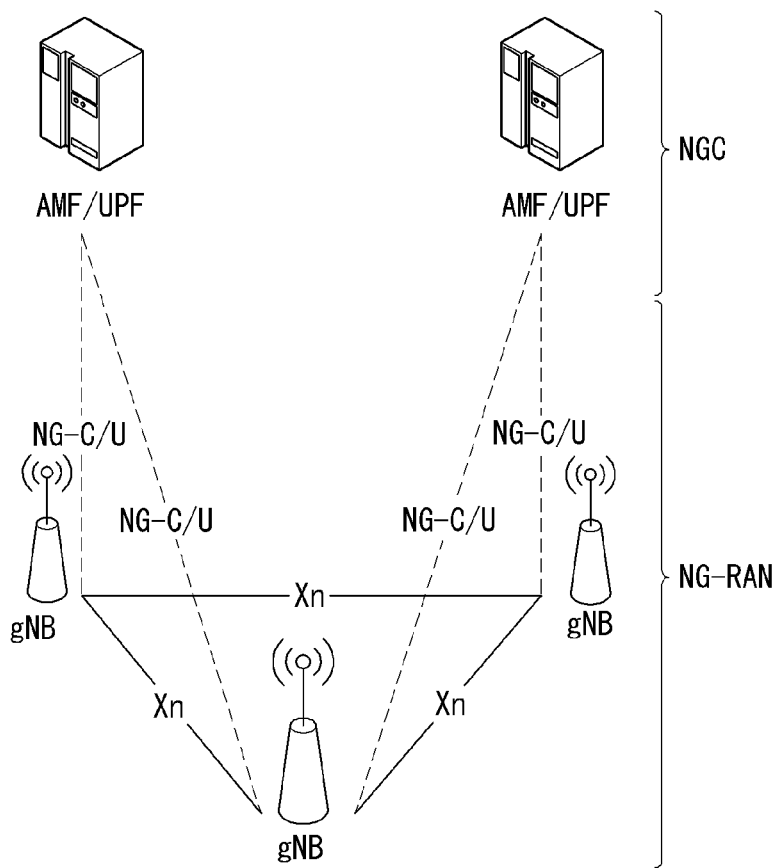
【FIG. 5】
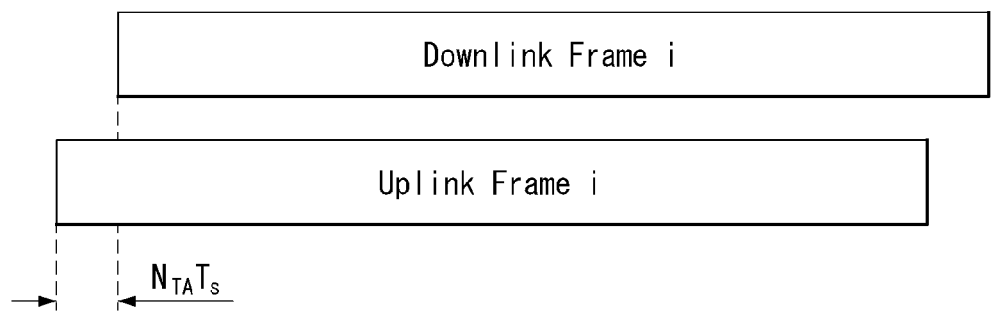

[FIG. 6]
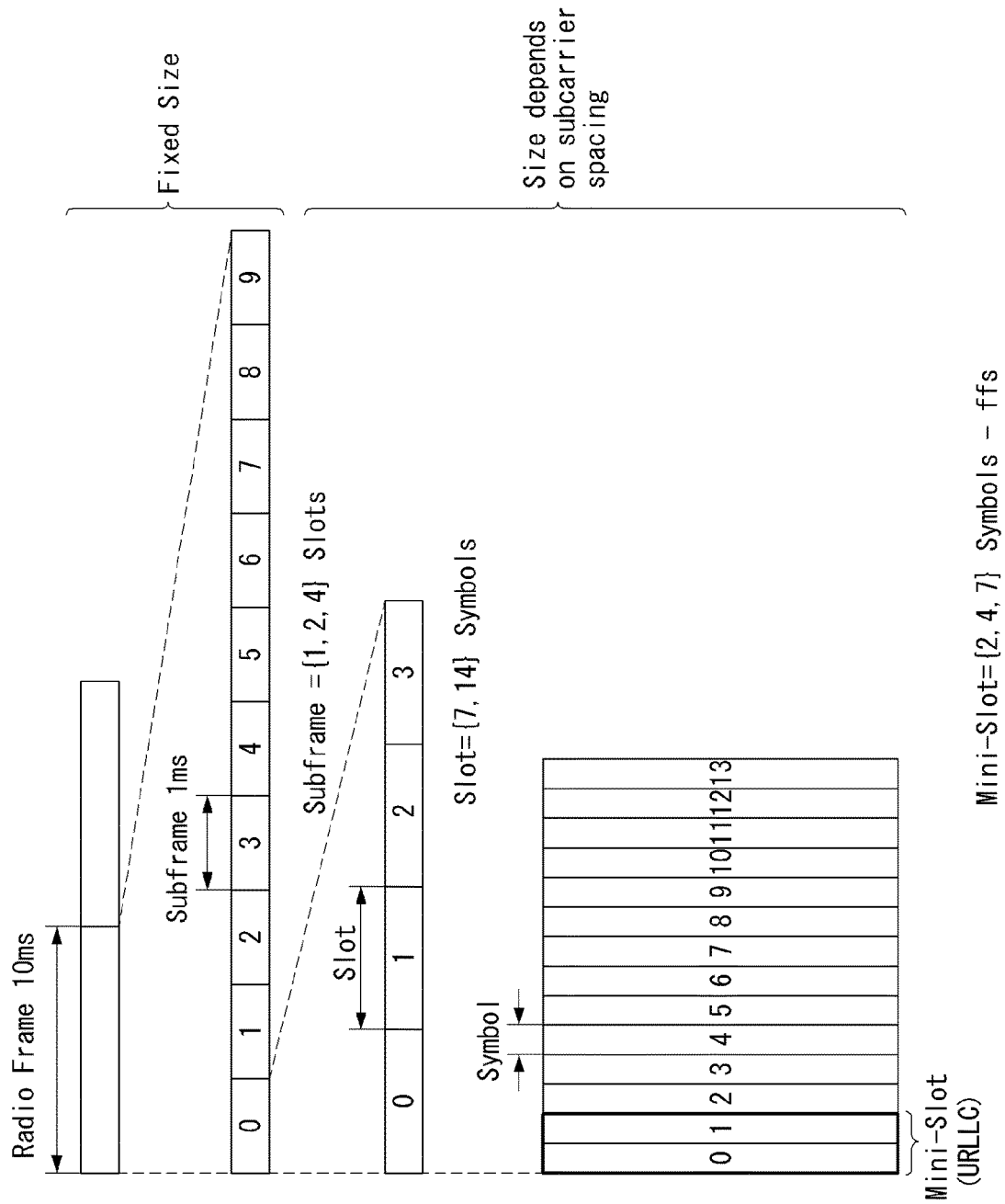

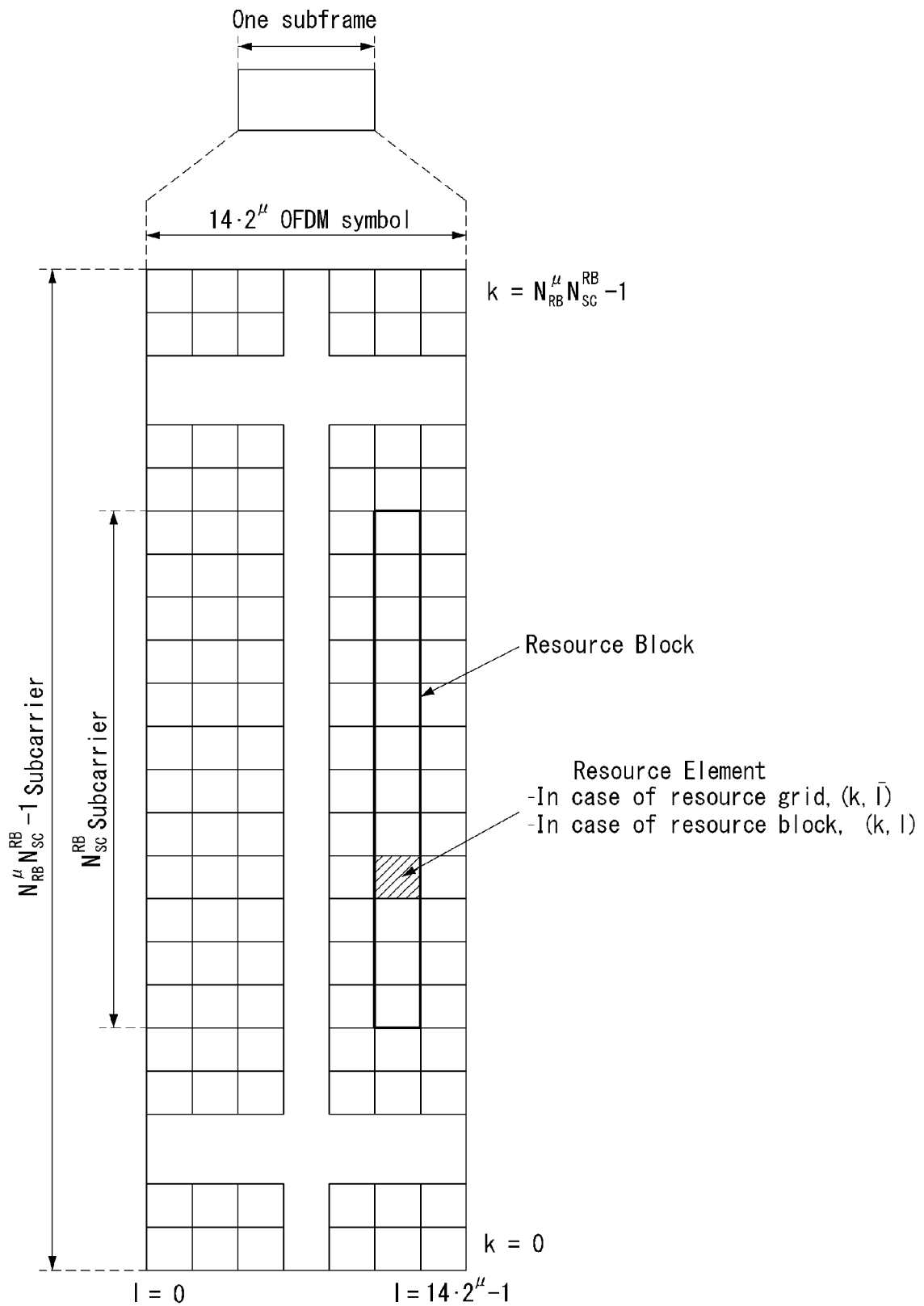
[FIG. 7]

[FIG. 8]
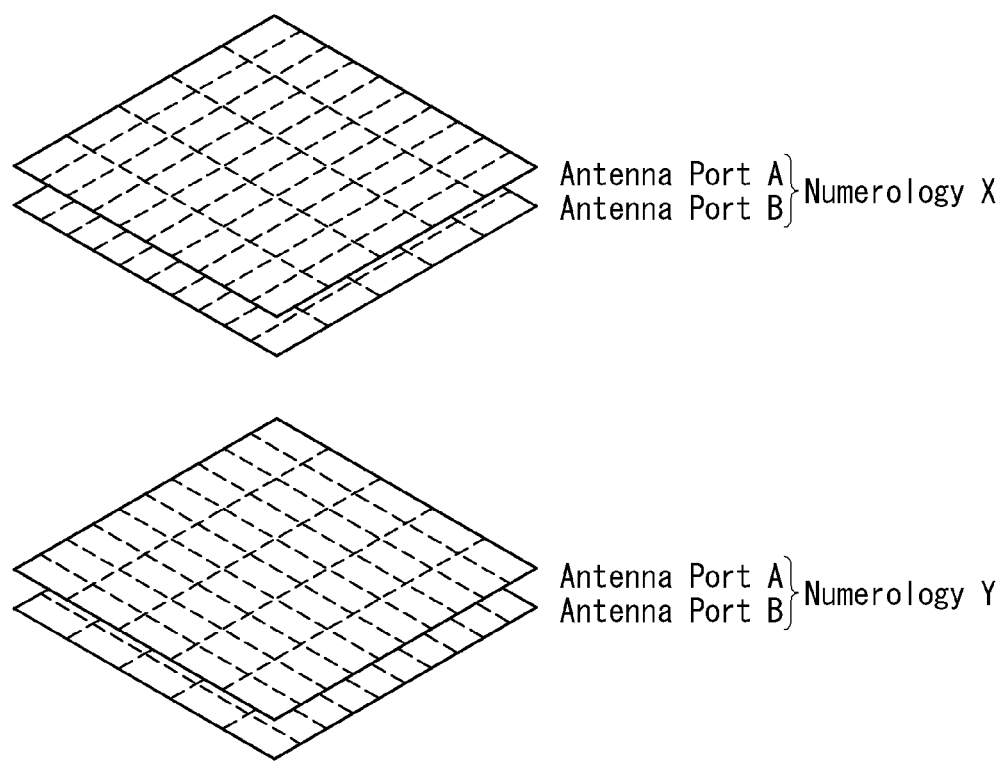

[FIG. 9]
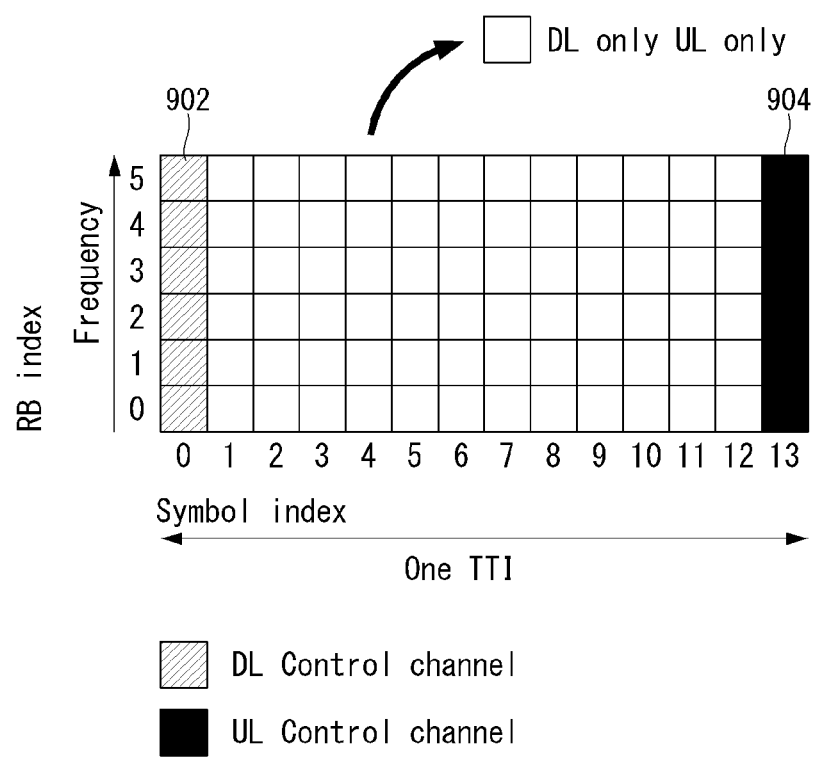

[FIG. 10]
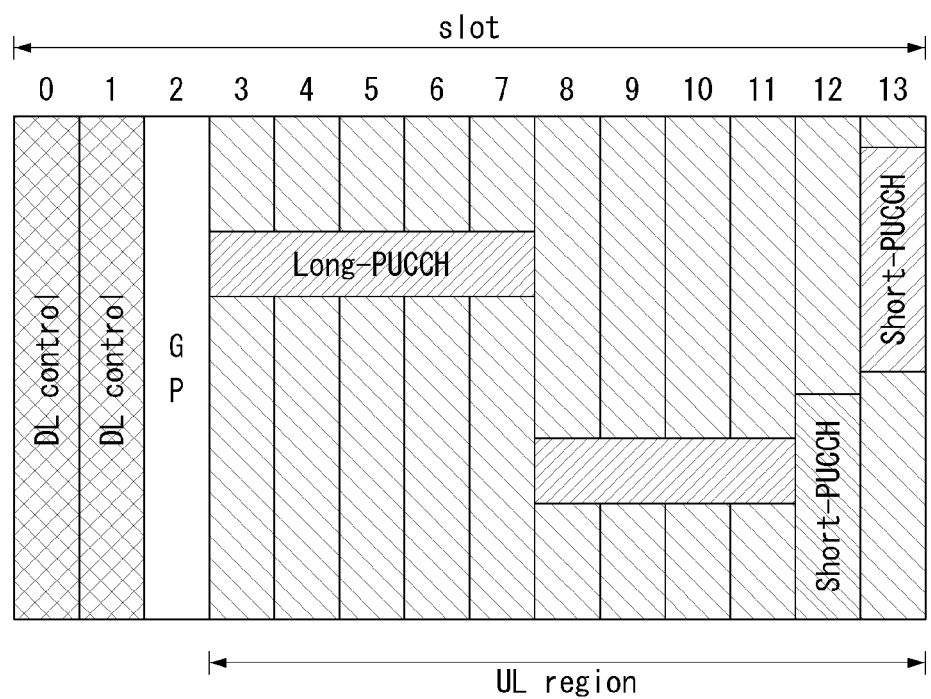

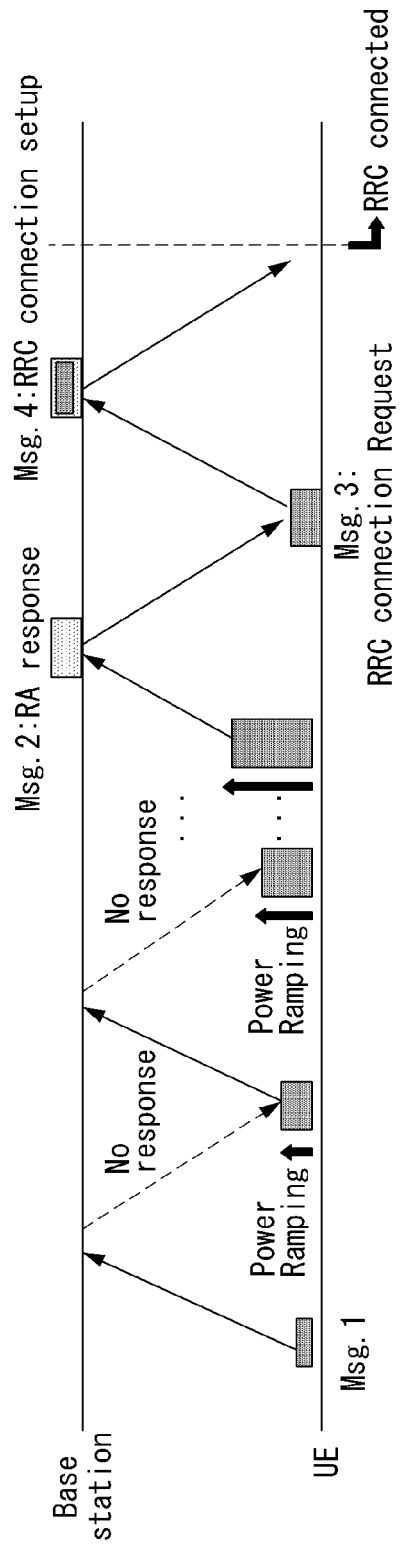
[FIG. 11]

[FIG. 12]
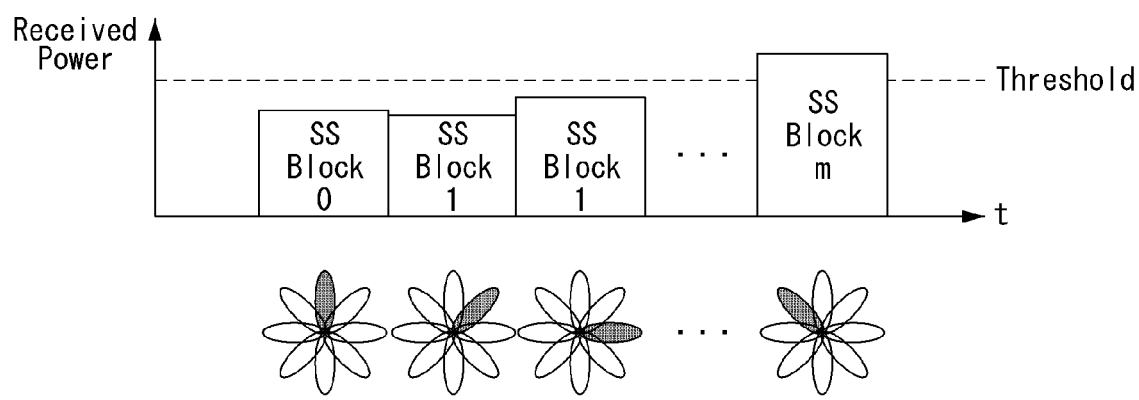
[FIG. 13]
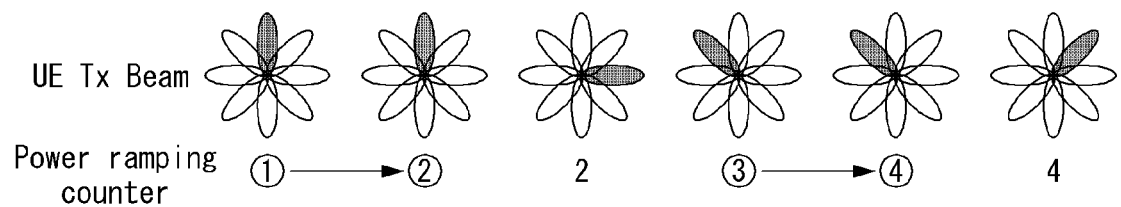

[FIG. 14]
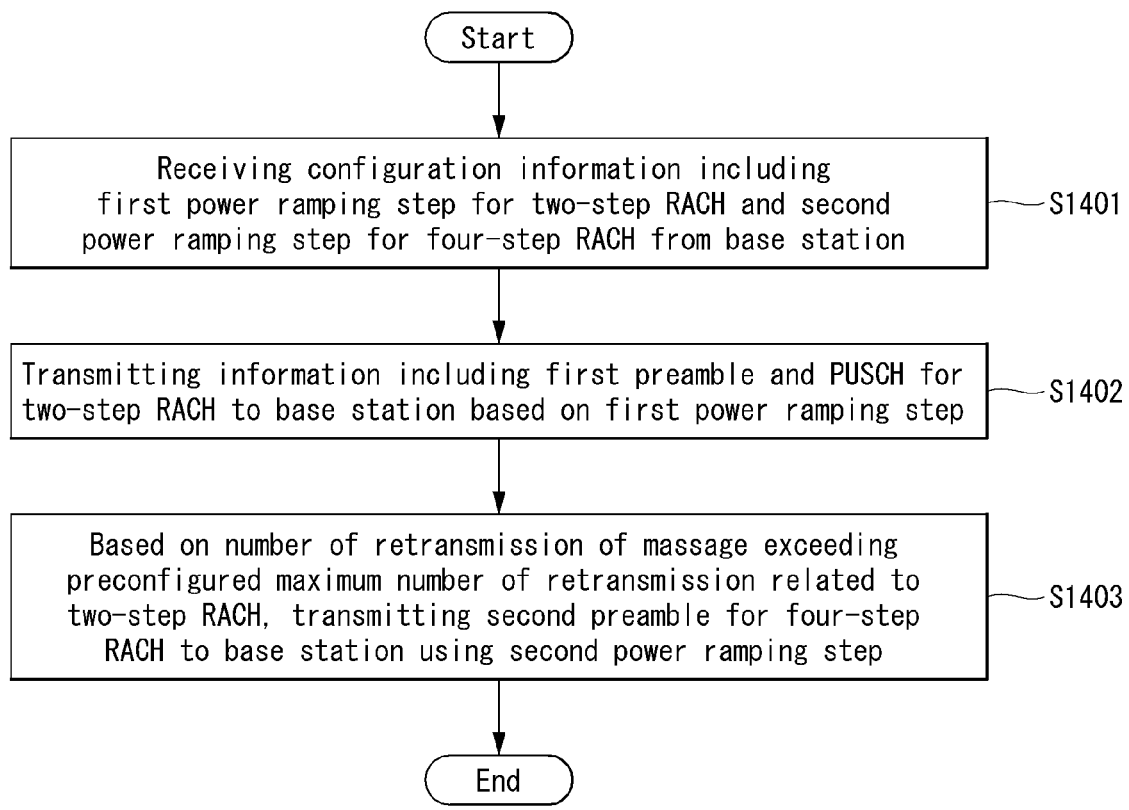

[FIG. 15]
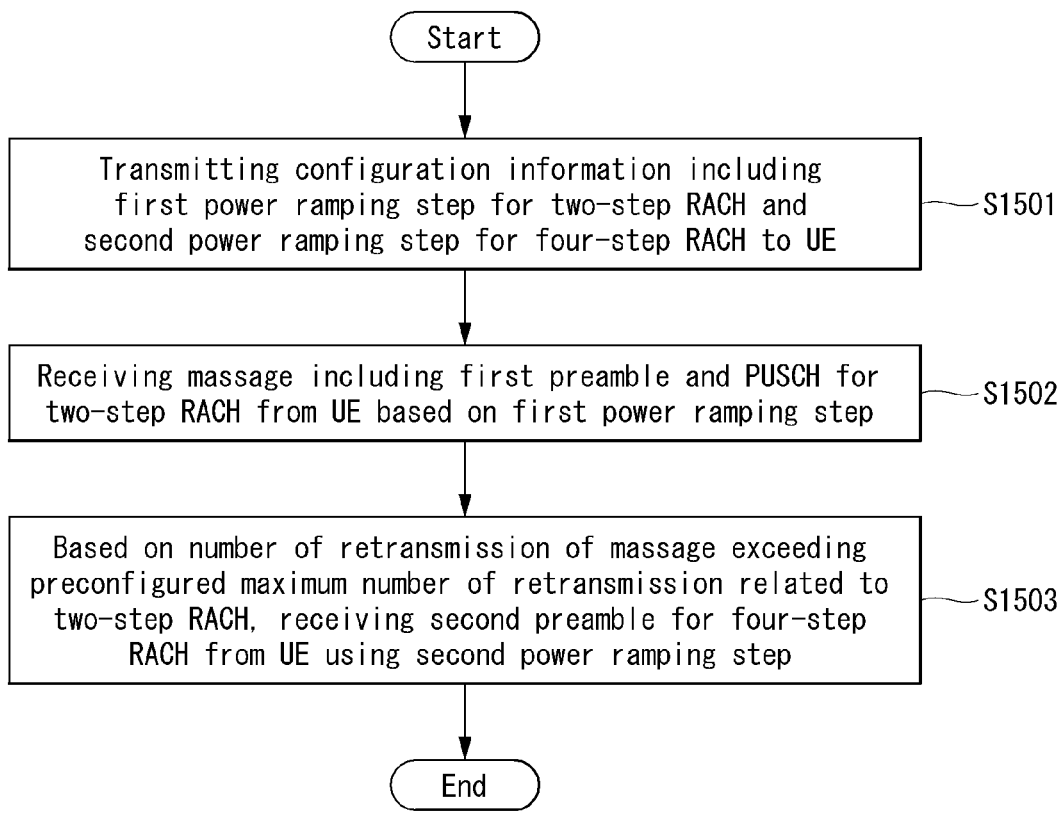

[FIG. 16]
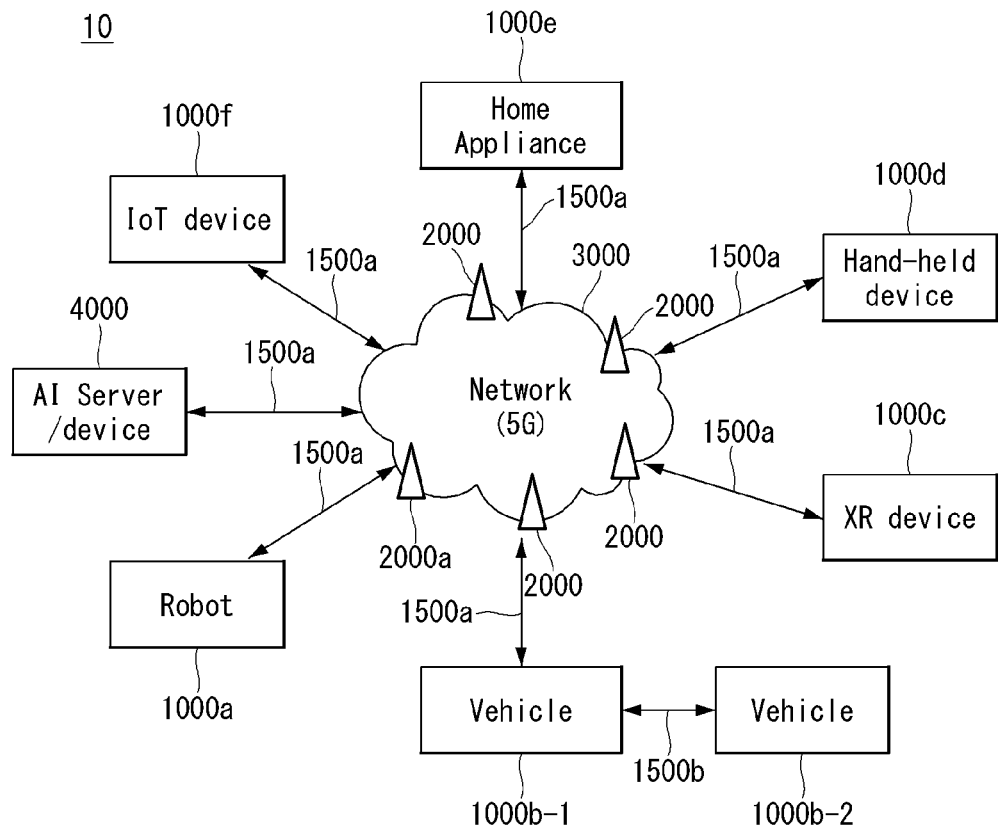
[FIG. 17]
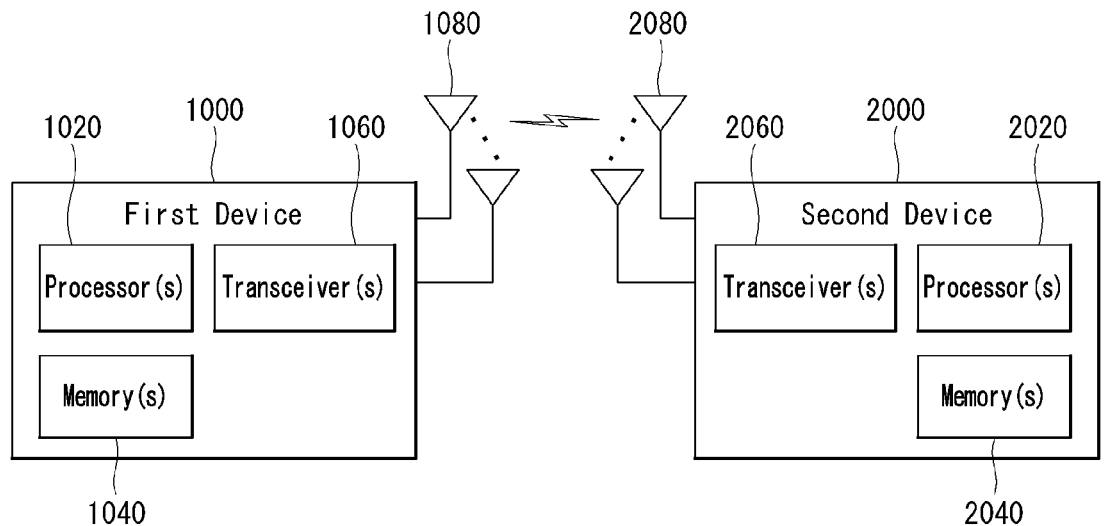

[FIG. 18]
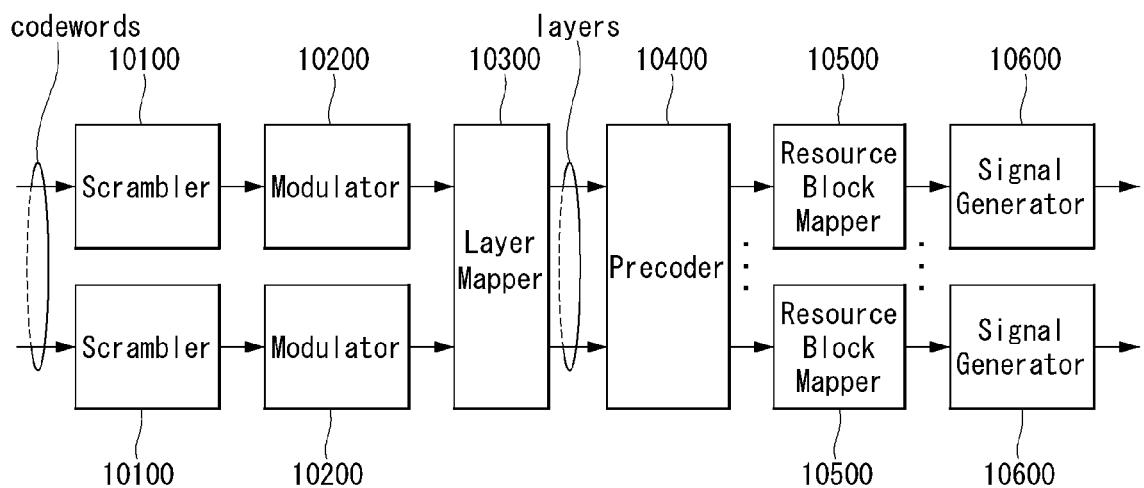
[FIG. 19]
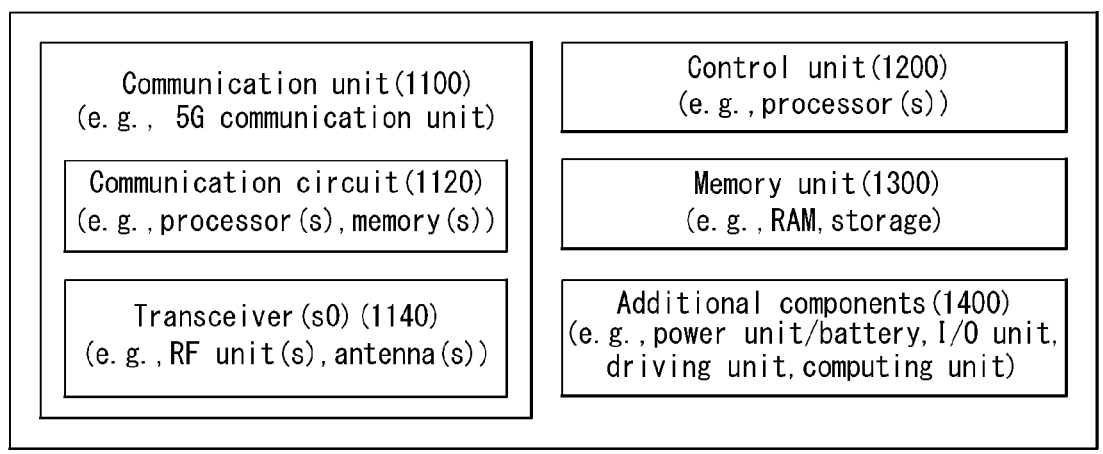

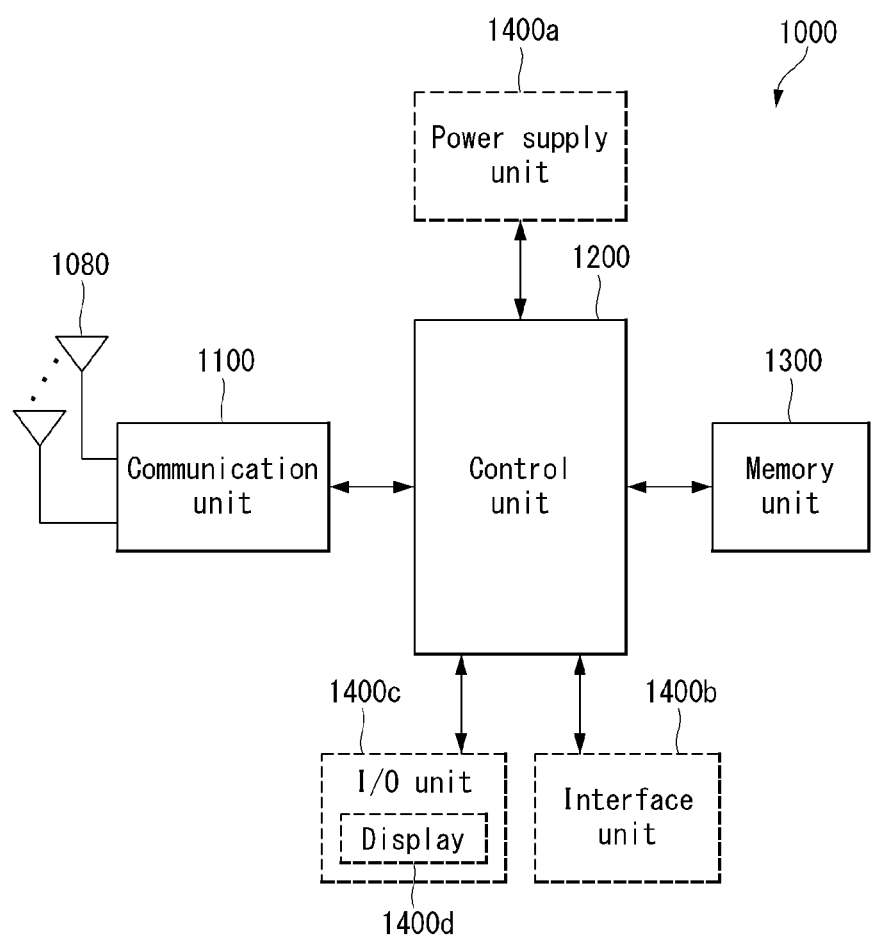
[FIG. 20]

METHOD FOR TRANSMITTING AND RECEIVING PHYSICAL RANDOM ACCESS CHANNEL PREAMBLE IN WIRELESS COMMUNICATION SYSTEM AND APPARATUS THEREFOR

This application is the National Stage filing under 35 U.S.C. 371 of International Application No. PCT/KR2020/001430, filed on Jan. 30, 2020, which claims the benefit of Korean Application No. 10-2019-0014024, filed on Feb. 1, 2019, the contents of which are all hereby incorporated by reference herein in their entirety.

TECHNICAL FIELD

The present disclosure relates to a wireless communication system, and more specifically, to a method of transmitting and receiving a physical random access channel (PRACH) preamble and an apparatus supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to be able to support the accommodation of explosive data traffic, a dramatic increase in the data rate per user, the accommodation of a significant increase in the number of connected devices, very low end-to-end latency, and high energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The present disclosure proposes a method and an apparatus for configuring a power ramping step for a two-step random access channel (RACH) separately from a power ramping step for a four-step RACH.

In addition, the present disclosure proposes a method and an apparatus for transmitting a physical random access channel (PRACH) preamble and a physical uplink shared channel (PUSCH) using the same size of the power ramping step during a two-step RACH operation.

In addition, the present disclosure proposes a method and an apparatus for converting from a two-step RACH to a four-step RACH using a maximum number of retransmission related to the two-step RACH.

Technical problems to be solved by the present disclosure are not limited by the above-mentioned technical problems, and other technical problems which are not mentioned above can be clearly understood from the following description by those skilled in the art to which the present disclosure pertains.

Technical Solution

The present disclosure proposes a method of transmitting a physical random access channel (PRACH) preamble in a wireless communication system. The method performed by a user equipment (UE) may include receiving configuration information including a first power ramping step for a two-step random access channel (RACH) and a second power ramping step for a four-step RACH from a base station, transmitting information including a first preamble and a physical uplink shared channel (PUSCH) for the two-step RACH to the base station based on the first power ramping step, and based on a number of retransmission of the information exceeding a preconfigured maximum number of retransmission related to the two-step RACH, transmitting a second preamble for the four-step RACH to the base station using the second power ramping step.

In addition, in the method of the present disclosure, a size of the first power ramping step may be different from a size of the second power ramping step.

In addition, in the method of the present disclosure, the preconfigured maximum number of retransmission related to the two-step RACH may be smaller than a maximum number of retransmission related to the four-step RACH.

In addition, in the method of the present disclosure, a number of retransmission of the second preamble may be counted in addition to the number of retransmission of the information.

In addition, in the method of the present disclosure, the PUSCH may be transmitted using the same power ramping step and power ramping counter as the first preamble.

In addition, in the method of the present disclosure, the PUSCH may include a UE ID and a connection request.

In addition, a user equipment (UE) transmitting a physical random access channel (PRACH) preamble in a wireless communication system of the present disclosure includes one or more transceivers, one or more processors, and one or more memories functionally connected to the one or more processors, and storing instructions for performing operations, wherein the operations may include receiving configuration information including a first power ramping step for a two-step random access channel (RACH) and a second power ramping step for a four-step RACH from a base station, transmitting information including a first preamble and a physical uplink shared channel (PUSCH) for the two-step RACH to the base station based on the first power ramping step, and based on a number of retransmission of the information exceeding a preconfigured maximum number of retransmission related to the two-step RACH, transmitting a second preamble for the four-step RACH to the base station using the second power ramping step.

In addition, in the UE of the present disclosure, a size of the first power ramping step may be different from a size of the second power ramping step.

In addition, in the UE of the present disclosure, the preconfigured maximum number of retransmission related to the two-step RACH may be smaller than a maximum number of retransmission related to the four-step RACH.

In addition, in the UE of the present disclosure, a number of retransmission of the second preamble may be counted in addition to the number of retransmission of the information.

In addition, in the UE of the present disclosure, the PUSCH may be transmitted using the same power ramping step and power ramping counter as the first preamble.

In addition, in the UE of the present disclosure, the PUSCH may include a UE ID and a connection request.

In addition, an apparatus comprising one or more memories and one or more processors functionally connected to the one or more memories of the present disclosure, wherein the one or more processors may be configured to cause the apparatus to receive configuration information including a first power ramping step for a two-step random access channel (RACH) and a second power ramping step for a four-step RACH from a base station, transmit information including a first preamble and a physical uplink shared channel (PUSCH) for the two-step RACH to the base station based on the first power ramping step, and based on a number of retransmission of the information exceeding a preconfigured maximum number of retransmission related to the two-step RACH, transmit a second preamble for the four-step RACH to the base station using the second power ramping step.

In addition, a non-transitory computer readable medium (CRM) storing one or more instructions of the present disclosure, wherein the one or more instructions, that are executable by one or more processors, may cause a user equipment (UE) to receive configuration information including a first power ramping step for a two-step random access channel (RACH) and a second power ramping step for a four-step RACH from a base station, transmit information including a first preamble and a physical uplink shared channel (PUSCH) for the two-step RACH to the base station based on the first power ramping step, and based on a number of retransmission of the information exceeding a preconfigured maximum number of retransmission related to the two-step RACH, transmit a second preamble for the four-step RACH to the base station using the second power ramping step.

Advantageous Effects

According to the present disclosure, by configuring a power ramping step for a two-step random access channel (RACH) separately from a power ramping step for a four-step RACH, there is an effect of increasing the power efficiency.

In addition, according to the present disclosure, by transmitting a PRACH preamble and a physical uplink shared channel (PUSCH) using the same size of the power ramping step during a two-step RACH operation, there is an effect that can implement a low-delay communication system.

In addition, according to the present disclosure, by converting from a two-step RACH to a four-step RACH using a maximum number of retransmission related to the two-step RACH, there is an effect of securing high power efficiency and communication reliability.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 is a diagram showing an AI device to which a method proposed in the disclosure may be applied.

FIG. 2 is a diagram showing an AI server to which a method proposed in the disclosure may be applied.

FIG. 3 is a diagram showing an AI system to which a method proposed in the disclosure may be applied.

FIG. 4 illustrates an example of an overall structure of an NR system to which a method proposed in the disclosure may be applied.

FIG. 5 illustrates the relation between an uplink frame and a downlink frame in a wireless communication system to which a method proposed in the disclosure may be applied.

FIG. 6 illustrates an example of a frame structure in an NR system.

FIG. 7 illustrates an example of a resource grid supported in a wireless communication system to which a method proposed in the disclosure may be applied.

FIG. 8 illustrates examples of a resource grid per antenna port and numerology to which a method proposed in the disclosure may be applied.

FIG. 9 illustrates an example of a self-contained structure to which a method proposed in the disclosure may be applied.

FIG. 10 illustrates a configuration in which a short PUCCH and a long PUCCH are multiplexed with an uplink signal.

FIG. 11 illustrates an example of a random access procedure.

FIG. 12 shows concept of a threshold value for an SS block for RACH resource association.

FIG. 13 illustrates a power ramping counter when a UE performs beam switching.

FIG. 14 is a flowchart for explaining an operation method of a UE proposed in the present disclosure.

FIG. 15 is a flowchart for explaining an operation method of a base station proposed in the present disclosure.

FIG. 16 illustrates a communication system 10 applied to the present disclosure.

FIG. 17 illustrates wireless devices applicable to the present disclosure.

FIG. 18 illustrates a signal processing circuit for a transmission signal.

FIG. 19 illustrates another example of a wireless device applied to the present disclosure.

FIG. 20 illustrates a portable device applied to the present disclosure.

MODE FOR INVENTION

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the following, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Embodiments of the present disclosure may be supported by standard documents disclosed in at least one of IEEE 802, 3GPP, and 3GPP2 which are the wireless access systems. That is, steps or parts in the embodiments of the present disclosure which are not described to clearly show the technical spirit of the present disclosure may be supported by the standard documents. Further, all terms described in this document may be described by the standard document.

3GPP LTE/LTE-A/New RAT (NR) is primarily described for clear description, but technical features of the present disclosure are not limited thereto.

Hereinafter, examples of 5G use scenarios to which a method proposed in the disclosure may be applied are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

Automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotive, information exchange between an automotive and a supported infrastructure, and information exchange between automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 is a diagram showing an AI device 100 to which a method proposed in the disclosure may be applied.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 2 is a diagram showing the AI server 200 to which a method proposed in the disclosure may be applied.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 is a diagram showing an AI system 1 to which a method proposed in the disclosure may be applied.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100*a* may use sensor information obtained by at least one sensor among LIDAR, a radar, and a camera in order to determine the moving path and running plan.

The robot 100*a* may perform the above operations using a learning model configured with at least one artificial neural network. For example, the robot 100*a* may recognize a surrounding environment and object using a learning model, and may determine an operation using recognized surrounding environment information or object information. In this case, the learning model may have been directly trained in the robot 100*a* or may have been trained in an external device, such as the AI server 200.

In this case, the robot 100*a* may directly generate results using the learning model and perform an operation, but may perform an operation by transmitting sensor information to an external device, such as the AI server 200, and receiving results generated in response thereto.

The robot 100*a* may determine a moving path and running plan using at least one of map data, object information detected from sensor information, or object information obtained from an external device. The robot 100*a* may run along the determined moving path and running plan by controlling the driving unit.

The map data may include object identification information for various objects disposed in the space in which the robot 100*a* moves. For example, the map data may include object identification information for fixed objects, such as a wall and a door, and movable objects, such as a flowport and a desk. Furthermore, the object identification information may include a name, a type, a distance, a location, etc.

Furthermore, the robot 100*a* may perform an operation or run by controlling the driving unit based on a user's control/interaction. In this case, the robot 100*a* may obtain intention information of an interaction according to a user's behavior or voice speaking, may determine a response based on the obtained intention information, and may perform an operation.

AI+Self-Driving

An AI technology is applied to the self-driving vehicle 100*b*, and the self-driving vehicle 100*b* may be implemented as a movable type robot, a vehicle, an unmanned flight body, etc.

The self-driving vehicle 100*b* may include a self-driving control module for controlling a self-driving function. The self-driving control module may mean a software module or a chip in which a software module has been implemented using hardware. The self-driving control module may be included in the self-driving vehicle 100*b* as an element of the self-driving vehicle 100*b*, but may be configured as separate hardware outside the self-driving vehicle 100*b* and connected to the self-driving vehicle 100*b*.

The self-driving vehicle 100*b* may obtain state information of the self-driving vehicle 100*b*, may detect (recognize) a surrounding environment and object, may generate map data, may determine a moving path and running plan, or may determine an operation using sensor information obtained from various types of sensors.

In this case, in order to determine the moving path and running plan, like the robot 100*a*, the self-driving vehicle 100*b* may use sensor information obtained from at least one sensor among LIDAR, a radar and a camera.

Particularly, the self-driving vehicle 100*b* may recognize an environment or object in an area whose view is blocked or an area of a given distance or more by receiving sensor information for the environment or object from external devices, or may directly receive recognized information for the environment or object from external devices.

The self-driving vehicle 100*b* may perform the above operations using a learning model configured with at least one artificial neural network. For example, the self-driving vehicle 100*b* may recognize a surrounding environment and object using a learning model, and may determine the flow of running using recognized surrounding environment information or object information. In this case, the learning model may have been directly trained in the self-driving vehicle 100*b* or may have been trained in an external device, such as the AI server 200.

In this case, the self-driving vehicle 100*b* may directly generate results using the learning model and perform an operation, but may perform an operation by transmitting sensor information to an external device, such as the AI server 200, and receiving results generated in response thereto.

The self-driving vehicle 100*b* may determine a moving path and running plan using at least one of map data, object information detected from sensor information or object information obtained from an external device. The self-driving vehicle 100*b* may run based on the determined moving path and running plan by controlling the driving unit.

The map data may include object identification information for various objects disposed in the space (e.g., road) in which the self-driving vehicle 100*b* runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100*b* may perform an operation or may run by controlling the driving unit based on a user's control/interaction. In this case, the self-driving vehicle 100*b* may obtain intention information of an interaction according to a user' behavior or voice speaking, may determine a response based on the obtained intention information, and may perform an operation.

AI+XR

An AI technology is applied to the XR device 100*c*, and the XR device 100*c* may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100*c* may generate location data and attributes data for three-dimensional points by analyzing three-dimensional point cloud data or image data obtained through various sensors or from an external device, may obtain information for a surrounding space or real object based on the generated location data and attributes data, and may output an XR object by rendering the XR object. For example, the XR device 100*c* may output an XR object, including additional information for a recognized object, by making the XR object correspond to the corresponding recognized object.

The XR device 100*c* may perform the above operations using a learning model configured with at least one artificial neural network. For example, the XR device 100*c* may recognize a real object in three-dimensional point cloud data or image data using a learning model, and may provide information corresponding to the recognized real object. In this case, the learning model may have been directly trained in the XR device 100*c* or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously run along a given flow without control of a user or that autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through a LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

As smartphones and Internet of Things (IoT) terminals are rapidly spread, the amount of information exchanged through a communication network is increasing. As a result, next-generation wireless access technologies can provide faster service to more users than traditional communication systems (or traditional radio access technologies) (e.g., enhanced mobile broadband communication) Needs to be considered.

To this end, the design of a communication system that considers Machine Type Communication (MTC), which provides services by connecting a number of devices and objects, is being discussed. It is also being discussed as a multiuser of communication systems (e.g., Ultra-Reliable and Low Latency Communication, URLLC) that take into account the reliability and/or latency-sensitive services (service) and/or a user equipment.

Hereinafter, in the present disclosure, for convenience of description, the next generation radio access technology is referred to as NR (New RAT), and the radio communication system to which the NR is applied is referred to as an NR system.

DEFINITION OF TERMS eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 4 illustrates an example of an overall structure of an NR system to which a method proposed in the disclosure may be applied.

Referring to FIG. 4, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 1

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 2.

TABLE 2

| μ | $\Delta f = 2^\mu \cdot 15 [kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max}/N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 5 illustrates the relation between an uplink frame and a downlink frame in a wireless communication system to which a method proposed in the disclosure may be applied.

As illustrated in FIG. 5, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots, \mu}-1\}$ within a subframe and are numbered in increasing order of $n_{s,f}^\mu \in \{0, \ldots, N_{frame}^{slots, \mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ slot of slots per radio frame, and the number $N_{slot}^{subframe,\mu}$ slot of slots per subframe in a normal CP. Table 4 represents the number of OFDM symbols per slot, the number of slots per radio frame, and the number of slots per subframe in an extended CP.

TABLE 3

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 6 illustrates an example of a frame structure in an NR system. FIG. 6 is merely for convenience of explanation and does not limit the scope of the disclosure.

In Table 3, in the case of $\mu=2$, i.e., as an example in which a subcarrier spacing (SCS) is 60 kHz, one subframe (or frame) may include four slots with reference to Table 4, and one subframe={1, 2, 4} slots shown in FIG. 6, for example, the number of slot(s) that may be included in one subframe may be defined as in Table 4.

Further, a mini-slot may consist of 2, 4, or 7 symbols, or may consist of more symbols or less symbols.

In relation to physical resources in the NR system, an antenna port, a resource grid, a resource element, a resource block, a carrier part, etc. may be considered.

Hereinafter, the above physical resources that can be considered in the NR system are described in more detail.

First, in relation to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 7 illustrates an example of a resource grid supported in a wireless communication system to which a method proposed in the disclosure may be applied.

Referring to FIG. 7, a resource grid consists of $N_{RB}^{\mu}N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^{\mu}N_{sc}^{RB}$ subcarriers, and $2^{\mu}N_{symb}^{(\mu)}$ OFDM symbols, where $N_{RB}^{\mu} \le N_{RB}^{max,\mu}$. $N_{RB}^{max,\mu}$ denotes a maximum transmission bandwidth and may change not only between numerologies but also between uplink and downlink.

In this case, as illustrated in FIG. 8, one resource grid may be configured per numerology μ and antenna port p.

FIG. 8 illustrates examples of a resource grid per antenna port and numerology to which a method proposed in the disclosure may be applied.

Each element of the resource grid for the numerology μ and the antenna port p is called a resource element and is uniquely identified by an index pair (k,l), where k=0, . . . , $N_{RB}^{\mu}N_{sc}^{RB}-1$ is an index on a frequency domain, and l=0, . . . , $2^{\mu}N_{symb}^{(\mu)}-1$ refers to a location of a symbol in a subframe. The index pair (k,l) is used to refer to a resource element in a slot, where l=0, . . . , $N_{symb}^{\mu}-1$.

The resource element (k,l) for the numerology μ and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

In this case, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

In this case, $N_{BWP,i}^{start}$ may be the common resource block where the BWP starts relative to the common resource block 0.

Self-Contained Structure

A time division duplexing (TDD) structure considered in the NR system is a structure in which both uplink (UL) and downlink (DL) are processed in one slot (or subframe). The structure is to minimize a latency of data transmission in a TDD system and may be referred to as a self-contained structure or a self-contained slot.

FIG. 9 illustrates an example of a self-contained structure to which a method proposed in the disclosure may be applied. FIG. 9 is merely for convenience of explanation and does not limit the scope of the disclosure.

Referring to FIG. 9, as in legacy LTE, it is assumed that one transmission unit (e.g., slot, subframe) consists of 14 orthogonal frequency division multiplexing (OFDM) symbols.

In FIG. 9, a region 902 means a downlink control region, and a region 904 means an uplink control region. Further, regions (i.e., regions without separate indication) other than the region 902 and the region 904 may be used for transmission of downlink data or uplink data.

That is, uplink control information and downlink control information may be transmitted in one self-contained slot. On the other hand, in the case of data, uplink data or downlink data is transmitted in one self-contained slot.

When the structure illustrated in FIG. 9 is used, in one self-contained slot, downlink transmission and uplink transmission may sequentially proceed, and downlink data transmission and uplink ACK/NACK reception may be performed.

As a result, if an error occurs in the data transmission, time required until retransmission of data can be reduced. Hence, the latency related to data transfer can be minimized.

In the self-contained slot structure illustrated in FIG. 9, a base station (e.g., eNodeB, eNB, gNB) and/or a user equipment (UE) (e.g., terminal) require a time gap for a process for converting a transmission mode into a reception mode or a process for converting a reception mode into a transmission mode. In relation to the time gap, if uplink transmission is performed after downlink transmission in the self-contained slot, some OFDM symbol(s) may be configured as a guard period (GP).

Uplink Channel Structure

The UE transmits a related signal to the base station through an uplink channel to be described later, and the base station receives the related signal from the UE through the following uplink channel.

(1) Physical Uplink Shared Channel (PUSCH)

A PUSCH carries uplink data (e.g. UL-shared channel transport block, UL-SCH TB) and/or uplink control information (UCI), and is transmitted based on a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFT-s-OFDM waveform, the UE transmits the PUSCH by applying transform precoding. For example, when the transform precoding is impossible (e.g. transform precoding is disabled), the UE may transmit the PUSCH based on the CP-OFDM waveform, and when the transform precoding is possible (e.g. transform precoding is enabled), the UE may transmit the PUSCH based on the CP-OFDM waveform or the DFT-s-OFDM waveform. The PUSCH transmission may be dynamically scheduled by a UL grant in DCI, or semi-statically scheduled (configured grant) based on higher layer (e.g. RRC) signaling (and/or Layer 1 (L1) signaling (e.g. PDCCH)). The PUSCH transmission may be performed based on a codebook or a non-codebook.

(2) Physical Uplink Control Channel (PUCCH)

A PUCCH carries uplink control information, HARQ-ACK and/or scheduling request (SR), and is divided into a Short PUCCH and a Long PUCCH according to a PUCCH transmission length. Table 5 illustrates PUCCH formats.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-5 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI with a maximum size of 2 bits, and is mapped and transmitted based on a sequence. Specifically, the UE transmit a specific UCI to the base station by transmitting one sequence among a plurality of sequences through the PUCCH of the PUCCH format 0. The UE transmits the PUCCH of the PUCCH format 0 in a PUCCH resource for configuring a corresponding SR only when transmitting a positive SR.

PUCCH format 1 carries UCI with a maximum size of 2 bits, and a modulation symbol is spread by an orthogonal cover code (OCC) (configured differently depending on whether frequency hopping is performed) in the time domain. DMRS is transmitted in a symbol in which the modulation symbol is not transmitted (that is, time division multiplexing (TDM) is performed and transmitted).

PUCCH format 2 carries UCI with a bit size larger than 2 bits, and the modulation symbol is frequency division multiplexed (FDMed) with the DMRS and transmitted. DM-RS is located at symbol indexes #1, #4, #7, and #10 in a given resource block with a density of ⅓. A Pseudo Noise (PN) sequence is used for a DM_RS sequence. For 2-symbol PUCCH format 2, the frequency hopping may be activated.

PUCCH format 3 is not UE multiplexed in the same physical resource blocks, and carries UCI with a bit size larger than 2 bits. In other words, the PUCCH resource of the PUCCH format 3 does not include the orthogonal cover code. The modulation symbol is time division multiplexed (TDMed) with DMRS and transmitted.

PUCCH format 4 supports multiplexing up to 4 UEs in the same physical resource blocks, and carries UCI with a bit size larger than 2 bits. In other words, the PUCCH resource of the PUCCH format 3 includes the orthogonal cover code. The modulation symbol is time division multiplexed (TDMed) with DMRS and transmitted.

(3) Multiplexing of Short PUCCH and Long PUCCH

FIG. 10 illustrates a configuration in which a short PUCCH and a long PUCCH are multiplexed with an uplink signal.

PUCCH (e.g. PUCCH format 0/2) and PUSCH may be multiplexed in TDM or FDM scheme. A short PUCCH and a long PUCCH from different UEs may be multiplexed in the TDM or FDM scheme. The short PUCCHs from a single UE in one slot may be multiplexed in the TDM scheme. The short PUCCH and the long PUCCH from a single UE in one slot may be multiplexed in the TDM or FDM scheme.

Power Control for PUSCH

The configuration of the UE transmission power for the PUSCH transmission may be defined as follows.

When the UE transmits the PUSCH without a simultaneous PUCCH for a serving cell c, the UE transmission power $P_{PUSCH,c}^{(i)}$ for the PUSCH transmission in the subframe/slot/subslot i for the serving cell c is given by Equation 3 below.

[Equation 3]

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

[dBm]

When the UE transmits the PUSCH simultaneously with the PUCCH for the serving cell c, the UE transmission power $P_{PUSCH,c}^{(i)}$ for the PUSCH transmission in the subframe/slot/subslot i for the serving cell c is as shown in Equation 4 below.

[Equation 4]

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

[dBm]

When the UE does not transmit the PUSCH for the serving cell c, for DCI format 3/3A for the PUSCH and accumulation of received TCI commands, the UE transmission power $P_{PUSCH,c}^{(i)}$ for the PUSCH transmission in the subframe i for the serving cell c is calculated by Equation 5 below.

[Equation 5]

$$P_{PUSCH,c}(i) = \\ \min\{P_{CMAX,c}(i), P_{O\_PUSCH,c}(1) + \alpha_c(1) \cdot PL_c + f_c(i)\}[dBm]$$

Here, $P_{CMAX,c}(i)$ is the configured UE transmission power $P_{PUSCH,c}^{(i)}$ defined in the subframe/slot/subslot i for the serving cell c, and $\hat{P}_{CMAX,c}(i)$ is a linearized value of $P_{CMAX,c}(i)$. When the UE transmits the PUCCH without the PUSCH in the subframe i for the serving cell c, for DCI format 3/3A for the PUSCH and accumulation of received TCI commands, the UE must assume $P_{CMAX,c}(i)$. When the UE does not transmit the PUCCH and PUSCH in the subframe i for the serving cell c, for the PUSCH, for DCI format 3/3A and accumulation of received TCI commands, the UE should calculate $P_{CMAX,c}(i)$ by assuming MPR=0 dB, A-MPR=0 dB, P-MPR=0 dB, and ΔTC=0.

$\hat{P}_{PUCCH}(i)$ is a linearized value of $P_{PUCCH}(i)$.

When the UE is a BL/CE UE configured with the upper layer parameter ce-PUSCH-SubPRB-Config-r15, and when using a valid PUSCH resource allocation uplink resource allocation type 5 for the serving cell c and the subframe $M_{PUSCH,c}(i)$ is a bandwidth of PUSCH resource allocation expressed as a fraction of a resource block, and is given by $M_{PUSCH,c}(i)$ ($M_{sc}^{RU}$+$Q_m$−2)/$N_{sc}^{RB}$. Otherwise, $M_{PUSCH,c}(i)$ is the bandwidth of the PUSCH resource allocation expressed as the number of valid resource blocks for the serving cell c and the subframe/slot/subslot i.

When the UE is configured with the upper layer parameter UplinkPowerControlDedicated-v12x0 for the serving cell c, and the subframe i belongs to the uplink power transmission subframe set 2 indicated by higher layer parameter tpc-SubframeSet-r12, When j=0, $P_{O\_PUSCH,c}(0)=P_{O\_UE\_PUSCH,c,2}(0)+P_{O\_NOMINAL\_PUSCH,c,2}(0)$, where j=0 is used for PUSCH (re)transmission corresponding to the semi-persistent grant.

$P_{O\_UE\_PUSCH,c,2}(0)$ and $P_{O\_NOMINAL\_PUSCH,c,2}(0)$ are parameters p0-UE-PUSCH-Persistent-SubframeSet2-r12, p0-NominalPUSCH-Persistent-SubframeSet2-r12 provided by the higher layers for the serving cell c, respectively.

When j=1, $P_{O\_PUSCH,c}(1)=P_{O\_UE\_PUSCH,c,2}(1)+P_{O\_NOMINAL\_PUSCH,c,2}(1)$, where j=1 is used for PUSCH (re)transmissions corresponding to dynamic scheduling grant.

$P_{O\_UE\_PUSCH,c,2}(1)$ and $P_{O\_NOMINAL\_PUSCH,c,2}(1)$ are parameters p0-UE-PUSCH-SubframeSet2-r12 and p0-NominalPUSCH-SubframeSet2-r12 provided by the higher layers for the serving cell c, respectively.

When j=2, $P_{O\_PUSCH,c}(2)=P_{O\_UE\_PUSCH,c}(2)+P_{O\_NOMINAL\_PUSCH,c}(2)$, where $P_{O\_UE\_PUSCH,c}(2)=0$ and $P_{O\_NOMINAL\_PUSCH,c}(2)=P_{O\_PRE}+\Delta_{PREAMBLE\_Msg3}$, where the parameters the parameter preambleInitialReceivedTargetPower ($P_{O\_PRE}$) and $\Delta_{PREAMBLE\_Msg3}$ are transmitted from the higher layers for the serving cell c. Here, j=2 is used for PUSCH (re)transmissions corresponding to the random access response grant.

Otherwise, $P_{O\_PUSCH,c}(j)$ is a parameter consisting of a sum of a component $P_{O\_NOMINAL\_PUSCH,c}(j)$ provided from the higher layers for j=0 and 1, and a component $P_{O\_UE\_PUSCH,c}(j)$ provided by the higher layers for j=0.

In the case of PUSCH (re)transmissions corresponding to semi-persistent grant, j=0, in the case of PUSCH (re)transmissions corresponding to dynamic scheduling grant, j=1, and in the case of PUSCH (re)transmissions corresponding to random access response grant, j=2, $P_{O\_UE\_PUSCH,c}(2)=0$, and $P_{O\_NOMINAL\_PUSCH,c}(2)=P_{O\_PRE}+\Delta_{PREAMBLE\_Msg3}$, where parameters preambleInitialReceivedTargetPower ($P_{O\_PRE}$) and $\Delta_{PREAMBLE\_Msg3}$ are transmitted from the higher layers for the serving cell c.

When the UE belongs to the higher layer parameter UplinkPowerControlDedicated-v12x0 for the serving cell c, and the subframe i belongs to the uplink transmission power control subframe set 2 indicated by the higher layer parameter tpc-SubframeSet-r12, When j=0 or 1, $\alpha_c(j)=\alpha_{c,2}\in\{0, 0.4, 0.5, 0.6, 0.7, 0.8, 0.9, 1\}$, $\alpha_{c,2}$ is the parameter alpha-SubframeSet2-r12 provided by the higher layers for each serving cell c.

When j=2, it is $\alpha_c(j)=1$.

In addition, when the UE is configured as the higher layer parameter UplinkPowerControlDedicated-v15x0 for the serving cell c, when j=0 or 1, it is $\alpha_c(j)=\alpha_{c,UE}\in\{0, 0.4, 0.5, 0.6, 0.7, 0.8, 0.9, 1\}$. $\alpha_{c,UE}$ is the parameter alpha-UE-r15 provided by the higher layers for each serving cell c.

When j=2, it is $\alpha_c(j)=1$.

Otherwise, when j=0 or 1, $\alpha_c\in\{0, 0.4, 0.5, 0.6, 0.7, 0.8, 0.9, 1\}$ is a 3-bit parameter provided by the higher layers for the serving cell c. When j=2, it is $\alpha_c(i)=1$.

$PL_c$ is a downlink path loss estimate calculated in the UE for the serving cell c in dB. And, $PL_c$=referenceSignalPower−higher layer filtered RSRP. Here, referenceSignalPower is provided by the higher layers.

Here, $K_S=1.25$, it is $\Delta_{TF,c}(i)=10 \log_{10}((2^{BPRE \cdot K_s}-1) \cdot \beta_{offset}^{PUSCH})$, and for $K_S=0$, it is zero Here, $K_S$ is provided by the parameter deltaMCS-Enabled provided by the higher layers for each serving cell c. For each serving cell c, BPRE and $\beta_{offset}^{PUSCH}$ are computed as follows. For transmission mode 2, it is $K_S=0$.

$\delta_{PUSCH,c}$ is an error value, expressed as a TPC command, and included in PDCCH/EPDCCH with DCI format 0/0A/0B/4/4A/4B or in PDCCH/SPDCCH with DCI format 7-0A/7-0B, or in MPDCCH with DCI format 6-0. In addition, it is coded together with other TPC commands in the PDCCH/MPDCCH of DCI format 3/3A in which the CRC parity bit is scrambled to TPC-PUSCH-RNTI. When the UE is configured with the higher layer parameter UplinkPowerControlDedicated-v12x0 for the serving cell c and the subframe i belongs to the uplink power control subframe set 2 indicated by the higher layer parameter tpc-SubframeSet-r12, a current PUSCH power control adjustment state for the serving cell c is given by $f_{c,2}(i)$. And, the UE should use $f_{c,2}(i)$ instead of $f_c(i)$ to determine $P_{PUSCH,c}(i)$.

Otherwise, the current PUSCH power control adjustment state for the serving cell c is given by $f_c(i)$. When the UE is configured with a plurality of uplink SPS configuration, $\delta_{PUSCH,c,x}$ is an error value and is expressed as a TPC command, and is coded together with other TPC commands in the PDCCH of DCI format 3/3A where the CRC parity bits are scrambled to TPC-PUSCH-RNTI. Here, x is SPS-ConfigIndex-r14, and $f_{c,2}(i)$ and $f_c(i)$ are replaced with $f_{c,2,x}(i)$ and $f_{c,x}(i)$, respectively.

Aerial Communication

Performance Requirement

Table 6 below shows connectivity service requirements for air vehicles in the LTE system.

TABLE 6

| Items | Value | |
|---|---|---|
| Data type | 1. | C&C: This includes telemetry, waypoint update for autonomous UAV operation, real time piloting, identity. flight authorization, navigation database update, etc. |
| | 2. | Application Data: This includes video (streaming), images, other sensors data, etc. |
| Latency (NOTE) | 1. | C&C: 50 ms (one way from eNB to UAV) |
| | 2. | Application data:: similar to LTE UE (terrestrial user) |
| DL/UL data rate | 1. | C&C: 60-100 kbps for UL/DL |
| | 2. | Application data: up to 50 Mbps for UL |
| C&C Reliability | | Up to $10^{-3}$ Packet Error Loss Rate |

Potential Power Control Enhancements for Mitigating Uplink Interference in the Air (1) UE-Specific Partial Path Loss Compensation Coefficient An enhancement to the existing open-loop power control mechanism is considered.

Here, the UE-specific partial path loss compensation coefficient $\alpha_{UE}$ is introduced. With the introduction of the UE-specific partial path loss compensation coefficient $\alpha_{UE}$, it is possible to configure the UEs in the air as $\alpha_{UE}$ different from the partial path loss compensation coefficient configured for the UEs on the ground. This solution requires a standard enhancement to the existing open-loop control mechanism to introduce the possibility to configure the partial path loss compensation coefficient from a UE-specific point of view.

(2) UE Specific P0 Parameter

When compared with P_0 configured in the UEs on the ground, P_0. Since UE-specific P_0 is already supported in the existing open-loop power control mechanism, no enhancements are required to the existing power control mechanism.

(3) Closed-Loop Power Control

The target reception powers for the UEs in the air are adjusted in consideration of both the serving cell and the neighbor cell measurement report. Since the UEs in the air are performed by the side lobes of the base station antennas, closed-loop power controls for the UEs in the air need to deal with potential rapid signal changes in the air. Therefore, specification enhancements for the increased step size of $\delta_{PUSCH,c}$ may be required.

RACH Procedure

RACH is used when the connection with the base station is disconnected or when communication with the first base station is requested. The related scenarios (scenarios requiring RACH) are divided into five categories as follows.

When the state of the UE is RRC_Connected but synchronization does not proceed, when new data or related control information transmission is required When the state of the UE is RRC_Connected but synchronization does not proceed, when new data is received and response information (ACK/NACK) transmission for this is required When the state of the UE is RRC_Connected and it is wanted to be transferred from the current serviced cell to an adjacent cell When it is necessary to convert from RRC_Idle state to RRC_Connected state When the connection with the base station is disconnected and recovering is required When performing RACH in the above situation, it is mainly divided into two types and procedures. It is divided into a contention-based procedure in which the probability of signal collision between UEs exists by transmitting preamble signal randomly selected by all UEs that often need synchronization using allocated resources and a contention-free procedure that eliminate the probability of collision by dynamically allocating a specific resource to a designated terminal before transmitting preamble signal.

A random access procedure of the UE may be summarized as shown in Table 7 and FIG. 11.

TABLE 7

| | Type of signal | Operation/Information acquired |
|---|---|---|
| Step 1 | PRACH preamble in UL | * Initial beam acquisition<br>* Random selection of RA-preamble ID |
| Step 2 | Random access response on DL-SCH | * Timing alignment information<br>* RA-Preamble ID<br>* Initial UL Grant, Temporary C-RNTI |
| Step 3 | UL transmission on UL-SCH | * RRC connection request<br>* UE identifier |
| Step 4 | Contention Resolution on DL | * Temporary C-RNTI on PDCCH for initial access<br>* C-RNTI on PDCCH for UE in RRC_CONNECTED |

FIG. 11 illustrates an example of a random access procedure.

First, the UE may transmit the PRACH preamble as Msg1 of the random access procedure in the UL.

Random access preamble sequences having two different lengths are supported. A long sequence length 839 is applied as a subcarrier spacing of 1.25 and 5 kHz, and a short sequence length of 139 is applied as subcarrier spacing of 15, 30, 60 and 120 kHz. The long sequence supports both an unlimited set and a limited set of types A and B, whereas the short sequence supports only the unlimited set.

A plurality of RACH preamble formats are defined with one or more RACH OFDM symbols, and different cyclic prefixes and guard times. A PRACH preamble configuration for use is provided to the UE in the system information.

If there is no response to Msg1, the UE may retransmit the PRACH preamble within a predetermined number of times by power ramping. The UE calculates the PRACH transmission power for retransmission of the preamble based on the most recent path loss and power ramping counter. When the UE performs beam switching, the power ramping counter is maintained unchanged.

The system information informs the UE of association between the SS block and the RACH resource.

FIG. 12 shows concept of a threshold value for an SS block for RACH resource association.

The threshold of an SS block for RACH resource association is based on RSRP and configurable network. Transmission or retransmission of the RACH preamble is based on SS blocks that meet the threshold.

When the UE receives a random access response on DL-SCH, the DL-SCH may provide timing alignment information, RA-preamble ID, initial UL grant and temporary C-RNTI.

Based on this information, the UE may transmit UL transmission on UL-SCH as Msg3 of the random access procedure. The Msg3 may include an RRC connection request and a UE identifier.

In response to this, the network may transmit Msg4, which may be treated as a contention resolution message on the DL. By receiving this, the UE may enter the RRC connected state.

A detailed description of each step is given below:

Before initiating a physical random access procedure, Layer-1 must receive a set of SS/PBCH block indices from a higher layer, and provide a set of RSRP measurements corresponding to this to the higher layer.

Before initiating the physical random access procedure, the Layer-1 must receive the following information from the higher layer:

Configuration of Physical Random Access Channel (PRACH) transmission parameters (PRACH preamble format, time resource, and frequency resource for PRACH transmission).

Parameters for determining root sequences in the PRACH preamble sequence set (index into logical root sequence table, cyclic shift ($N_{CS}$) and type of set (unrestricted set, restricted set A, or restricted set B)) and their cyclic shifts.

From the point of view of the physical layer, L1 random access procedure includes transmission of random access preamble (Msg1) in PRACH, random access response (RAR) message (Msg2) with PDCCH/PDSCH, and if applicable, Msg3 PUSCH for contention resolution, and transmission of PDSCH.

When the random access procedure is initiated by "PDCCH order" to the UE, random access preamble transmission is performed as an interval between subcarriers equal to random access preamble transmission initiated by the higher layer.

When the UE is configured with two UL carriers for one service cell, and the UE detects "PDCCH order", the UE determines a UL carrier for transmission of the corresponding random access preamble using a UL/SUL (supplement UL) indicator field value from the detected "PDCCH order".

With respect to the random access preamble transmission step, the physical random access procedure is triggered by a request for PRACH transmission by a higher layer or PDCCH order. Configuration by the higher layer for PRACH transmission includes:

Configuration for PRACH transmission.

Preamble index, interval between preamble subcarriers, $P_{PRACH,target}$, corresponding RA-RNTI, and PRACH resource.

The preamble is transmitted as transmission power $P_{PRACH,b,f,c}(i)$ using the PRACH format selected on the indicated PRACH resource.

A plurality of SS/PBCH blocks associated with one PRACH occasion are provided to the UE by a value of the higher layer parameter SSB-perRACH-Occasion. When the value of SSB-perRACH-Occasion is less than 1, one SS/PBCH block is mapped to 1/SSB-per-rach-occasion consecutive PRACH occasions. The UE is provided with a plurality of preambles per SS/PBCH block by the value of the higher layer parameter cb-preamblePerSSB, and the UE determines the total number of preambles per SSB for PRACH occasion as a multiple of the value of SSB-per-RACH-Occasion and the value of cb-preamblePerSSB.

SS/PBCH block index is mapped to PRACH occasions in the following order.

First, mapping in increasing order of preamble indices within a single PRACH occasion Second, mapping in increasing order of frequency resource indexes for frequency multiplex PRACH occasions.

Third, mapping in increasing order of time resource indexes for time multiplex PRACH occasions in the PRACH slot.

Fourth, mapping in increasing order of indexes for PRACH slots.

The period for mapping to PRACH occasions for the SS/PBCH block starts from frame 0, and is the smallest value among the {1, 2, 4} PRACH configuration periods greater than or equal to $\lfloor N_{Tx}^{SSB}/N_{PRACHperiod}^{SSB} \rfloor$, at this time, the UE acquires $N_{Tx}^{SSB}$ from the higher layer parameter SSB-transmitted-SIB1, and $N_{PRACHperiod}^{SSB}$ is the number of SS/PBCH blocks that can be mapped to one PRACH configuration period.

When the random access procedure is initiated by the PDCCH order, if a higher layer requests, the UE will transmit the PRACH on the first available PRACH occasion, and in this case, in the case of PDCCH, the time between the last symbol of reception and the first symbol of PRACH transmission is greater than or equal to $N_{T,2}+\Delta_{BWPSwitching}+\Delta_{Delay}$ milliseconds, where $N_{T,2}$ is the duration of symbols corresponding to the PUSCH preparation time for the PUSCH processing capacity, and $\Delta_{BWPSwitching}$ is defined in advance and it is $\Delta_{Delay} > 0$.

In response to PRACH transmission, the UE attempts to detect a PDCCH having a corresponding RA-RNTI during a window controlled by a higher layer. The window starts in the first symbol of the earliest control resource set configured by the UE for the Type1-PDCCH general search space, that is, after at least $\lfloor (\Delta \cdot N_{slot}^{subframe,\mu} \cdot N_{symb}^{slot})/T_{sf} \rfloor$ symbol after the last symbol of the preamble sequence transmission. The length of the window as the number of slots is provided by the higher layer parameter rar-WindowLength based on the interval between subcarriers for the Type0-PDCCH general search space.

When the UE detects PDCCH having an RA-RNTI and a corresponding PDSCH including a DL-SCH transport block within the corresponding window, the UE transfers the transport block to a higher layer. The higher layer parses a transport block for random access preamble identification (RAPID) associated with PRACH transmission. When the higher layer identifies the RAPID in the RAR message(s) of the DL-SCH transport block, the higher layer instructs the physical layer to allow the uplink. This is called a random access response (RAR) UL grant in the physical layer. When the higher layer does not identify the RAPID associated with PRACH transmission, the higher layer may instruct the physical layer to transmit the PRACH. The minimum time between the last symbol of PDSCH reception and the first symbol of PRACH transmission is equal to $N_{T,1}+\Delta_{new}+0.5$ milliseconds, where $N_{T,1}$ is configured with an additional PDSCH DM-RS, and when $\Delta_{new} \geq 0$, is an elapsed time of $N_1$ symbols corresponding to the PDSCH reception time for the PDSCH processing capacity 1.

The UE will receive the PDCCH having the corresponding RA-RNTI and the corresponding PDSCH including the detected SS/PBCH block or the DL-SCH transport block having the same DM-RS antenna port QCL (quasi co-location) attribute as the received CSI-RS. When the UE attempts to detect the PDCCH having the corresponding RA-RNTI as a response to the PRACH transmission initiated by the PDCCH order, the UE assumes that the PDCCH and the PDCCH order has the same DM-RS antenna port QCL attribute.

The RAR UL grant schedules PUSCH transmission from the UE (Msg3 PUSCH). The content of the RAR UL grant, starting at the MSB and ending at the LSB, are given in Table 8. Table 8 shows the random access response grant content field sizes.

TABLE 8

| RAR grant field | Number of bits |
| --- | --- |
| Frequency hopping flag | 1 |
| Msg3 PUSCH frequency resource allocation | 12 |
| Msg3 PUSCH time resource allocation | 4 |
| MCS | 4 |
| TPC command for Msg3 PUSCH | 3 |
| CSI Request | 1 |
| Reserved bit | 3 |

Msg3 PUSCH frequency resource allocation is for uplink resource allocation type 1. In the case of frequency hopping, based on the indication of the frequency hopping flag field, the first one or two bits, $N_{UL,hop}$ bits of the Msg3 PUSCH frequency resource allocation field are used as the hopping information bit.

The MCS is determined from the first 16 indexes of the MCS index table applicable to the PUSCH.

TPC command $\delta_{msg2,b,f,c}$ is used to configure the power of Msg3 PUSCH, and is interpreted according to Table 9. Table 9 shows the TPC command $\delta_{msg2,b,f,c}$ for Msg3 PUSCH.

TABLE 9

| TPC command | Value (in dB) |
| --- | --- |
| 0 | −6 |
| 1 | −4 |
| 2 | −2 |

TABLE 9-continued

| TPC command | Value (in dB) |
| --- | --- |
| 3 | 0 |
| 4 | 2 |
| 5 | 4 |
| 6 | 6 |
| 7 | 8 |

In the non-contention-based random access procedure, the CSI request field is interpreted as determining whether aperiodic CSI reporting is included in the corresponding PUSCH transmission. In the contention-based random access procedure, the CSI request field is reserved.

When the interval between subcarriers is not configured in the UE, this UE receives the following PDSCH using the same interval between subcarriers as in the case of PDSCH reception providing RAR messages.

When the UE does not detect the PDCCH having the corresponding RA-RNTI and a corresponding DL-SCH transport block within the window, the UE performs a procedure for failing to receive a random access response.

For example, the UE may perform power ramping for retransmission of the random access preamble based on the power ramping counter. However, as shown in FIG. 13, when the UE performs beam switching in PRACH retransmission, this power ramping counter remains unchanged.

In FIG. 13, when the UE retransmits the random access preamble for the same beam, the UE may increase the power ramping counter by 1. However, when the beam changes, this power ramping counter remains unchanged.

In relation to Msg3 PUSCH transmission, the higher layer parameter msg3-tp indicates to the UE whether the UE should apply transform precoding for Msg3 PUSCH transmission. When the UE applies transmission transform precoding to the Msg3 PUSCH having frequency hopping, the frequency offset for the second hop is given in Table 10. Table 10 shows the frequency offset for the second hop for transmission to the Msg3 PUSCH having frequency hopping.

TABLE 10

| Number of PRBs in initial active UL BWP | Value of $N_{UL,hop}$ hopping bit | Frequency offset for 2nd hop |
| --- | --- | --- |
| $N_{BWP}^{size} < 50$ | 0 | $N_{BWP}^{size}/2$ |
|  | 1 | $N_{BWP}^{size}/4$ |
| $N_{BWP}^{size} \geq 50$ | 00 | $N_{BWP}^{size}/2$ |
|  | 01 | $N_{BWP}^{size}/4$ |
|  | 10 | $-N_{BWP}^{size}/4$ |
|  | 11 | reserved |

The interval between subcarriers for Msg3 PUSCH transmission is provided by the higher layer parameter msg3-scs. The UE will transmit the PRACH and the Msg3 PUSCH on the same uplink carrier of the same service providing cell. UL BWP for Msg3 PUSCH transmission is indicated by SystemInformationBlock1.

When PDSCH and PUSCH have the same interval between subcarriers, the minimum time between the last signal of the PDSCH reception for transmitting the RAR and the first signal of the corresponding Msg3 PUSCH transmission scheduled by the RAR in the PDSCH for the UE is equal to $N_{T,1}+N_{T,2}+N_{TA,max}+0.5$ milliseconds. $N_{T,1}$ is an elapsed time of $N_1$ symbols corresponding to the PDSCH reception time for the PDSCH processing capacity 1 when the additional PDSCH DM-RS is configured, $N_{T,2}$ is an elapsed time of $N_2$ symbols corresponding to the PUSCH preparation time for PUSCH processing capacity 1, and $N_{TA,max}$ is a maximum timing adjustment value that can be provided by the TA command field in the RAR.

When the C-RNTI is not provided to the UE in response to the Msg3 PUSCH transmission, the UE attempts to detect a PDCCH having a corresponding TC-RNTI scheduling a PDSCH including identification of UE contention resolution. In response to the reception of the PDSCH having the identification of the UE contention resolution, the UE transmits HARQ-ACK information in the PUCCH. The minimum time between the last symbol of PDSCH reception and the first symbol of the corresponding HARQ-ACK transmission is equal to $N_{T,1}+0.5$ milliseconds. $N_{T,1}$ is an elapsed time of $N_1$ symbols corresponding to the PDSCH reception time for PDSCH processing capacity 1 when an additional PDSCH DM-RS is configured.

In LTE (Long-Term Evolution) or NR (New Radio) system, the UE may perform UL transmission through a random access procedure without receiving a direct uplink (UL) transmission schedule from a given base station (or cell).

In LTE or NR system, the random access procedure consists of preamble transmission, message 2 (Msg2) reception, Msg3 transmission, and Msg4 reception from the point of view of the UE. The Msg2 is a message in which the base station that has received random preamble allocates a UL resource for the UE transmitting the corresponding preamble to transmit Msg3. The UE transmits information such as a connection request along with its ID (IMSI, TIMSI, etc.) through the Msg3. Upon receiving Msg3, the base station transmits the ID of the corresponding UE and necessary information through the Msg4, thereby resolving collision in random access that may exist between different UEs.

A 2-step random access channel (RACH) is being discussed so that it can be utilized in small cells or unlicensed bandwidth by simplifying the processing delay of 4 steps as above.

The 2-step RACH is a scheme of resolving the collision in which the UE immediately transmits a message corresponding to Msg3 together with the preamble, and the base station responds with messages corresponding to Msg2 and Msg4 for this.

Hereinafter, for convenience of description, in the present disclosure, the entire message corresponding to the preamble and Msg3 in the 2-step random access scheme is referred to as MsgA, and Msg2 and Msg4 are referred to as MsgB.

During the 2-step RACH, since the preamble and data (e.g. Msg3) are transmitted together, if the reception of the preamble fails, it may take longer than a 4-step delay or be inefficient in terms of power due to the power consumption and processing delay according to the transmission (and/or retransmission) of PUSCH. Accordingly, the present disclosure proposes a power configuration scheme for retransmission. Specifically, the present disclosure proposes a power control method for retransmission of the MsgA.

Hereinafter, in the present disclosure, for convenience of description, 1) a power control method for retransmission of a preamble in the MsgA (hereinafter, a first embodiment), and 2) a power control method for retransmission of data (e.g. PUSCH) in the MsgA (hereinafter, a second embodiment) will be described separately.

Hereinafter, the methods described in the present disclosure are only divided for convenience of description, and it goes without saying that some components of any method may be substituted with, or combined with, components of other methods.

First Embodiment—(Power Control for Preamble Retransmission in MsgA)

First, a power control method for retransmission of a preamble in the MsgA will be described.

In the NR system, the UE configures the power required for retransmission of the preamble as follows.

For each random access preamble (or PRACH preamble, preamble), if PREAMBLE_TRANSMISSION_COUNTER is greater than 1, no notification of deferring or suspending the power ramping counter is received from lower layers, and the selected SSB does not change (i.e. the same as the previous random access preamble transmission), the MAC entity increases PREAMBLE_POWER_RAMPING_COUNTER by 1.

For each random access preamble, the MAC entity selects the value of DELTA_PREAMBLE according to a predefined specification (e.g. 3GPP TS 38 series), and configures PREAMBLE_RECEIVED_TARGET_POWER as preambleReceivedTargetPower+DELTA_PREAMBLE+(PREAMBLE_POWER_RAMPING_COUNTER−1)×PREAMBLE_POWER_RAMPING_STEP.

For each random access preamble, the MAC entity excludes the non-contention random access preamble for the beam failure recovery request, and calculates the RA-RNTI associated with the PRACH occasion in which the random access preamble is transmitted.

For each random access preamble, the MAC entity transmits a random access preamble using the selected Physical Random Access Channel (PRACH), in which the physical layer (if possible) corresponds to RA-RNTI, PREAMBLE_INDEX, and PREAMBLE_RECEIVED_TARGET_POWER.

The first embodiment proposes a method of configuring a ramping counter and a step size used for retransmission.

A separate step size for retransmission of the 2-step RACH may be configured.

The corresponding method is a scheme of configuring a ramping step for 2-step RACH in addition to powerRampingStep used for retransmission of existing 4-step RACH. For example, powerRamping2step may be added and configured separately. For example, a value of dB4 as the powerRampingStep for 4-step RACH and a value of dB6 as the powerRamping2step for 2-step RACH may be configured in the UE.

As another example, a value larger than x steps may be used automatically based on the configured powerRampingStep. For example, when dB2 among {dB0, dB2, dB4, dB6} is configured as the ramping step for Msg1 of the existing 4-step RACH, a step size (dB4 or dB6) higher by one or two steps may be automatically configured as a step size for retransmission of the 2-step RACH. And/or, a high priority power ramping step configured for handover or beam failure recovery may be applied and used to retransmission of the 2-step RACH as it is. For example, the retransmission of the 2-step RACH may be performed by applying the high priority power ramping step.

The corresponding method may be applied as follows depending on the time of application.

For example, the above suggested step size may be applied to all from the case where the counter is 2 or more. For example, retransmission may be performed by applying the above-described step size from the first retransmission.

Although the corresponding method is a method of reducing the number of retransmissions, power may be consumed inefficiently by configuring an unnecessary power step size.

As another example, the above suggested step size may be applied after a specific X counter. In other words, a 2-step ramping step may be applied after the specific X counter.

For example, a value (Preamble2stepTransMin) smaller than the retransmission number (PreambleTransMax) of maximum preamble may be configured. In other words, before the corresponding value, the preamble (or the MsgA) may be transmitted in the same step size as 4-step, and after the corresponding value, the preamble (or the MsgA) may be transmitted by applying the step size of the proposed 2-step RACH.

And/or, in the above method, continuously transmitting PUSCH may be inefficient in terms of power. Accordingly, a maximum value for 2-step preamble transmission (Preamble2stepTransMAX) that is larger than the configured Preamble2stepTransMin and smaller than PreambleTransMax may be additionally configured. The UE may not transmit the MsgA (i.e. simultaneously transmitting PUSCH and preamble) exceeding the maximum value. In other words, when the number of retransmissions exceeds Preamble2stepTransMAX, the UE may no longer transmit the MsgA for simultaneously transmitting the PUSCH and the preamble. The counter may be incremented by 1 based on the number of preamble retransmissions, and as described above, when the UE transmits only the preamble without transmitting the PUSCH, or when 2-step is converted to 4-step, the step size may follow the step size of a normal 4-step RACH in the above proposed step size. and/or, when 2-step is converted to 4-step, a preamble for 4-step is included in the same preamble group (e.g., group A or group B) as a preamble for 2-step. and/or, the preamble for 4-step is the same preamble as the preamble for 2-step.

Second Embodiment—(Power Control for Data Retransmission in MsgA)

Next, a power control method for data retransmission in the MsgA will be described.

In the first embodiment, the power ramping step and counter related to the preamble retransmission of the MsgA have been described. In the second embodiment, power transmission related to retransmission of data (e.g. PUSCH) associated with a corresponding preamble will be described.

In the case of 2-step RACH, since data is transmitted before MsgB reception, it is difficult to configure power based on feedback information from a separate base station. Accordingly, in the same form as the preamble of the first embodiment, retransmission of the previous data transmission may be performed by the counter and step size. In other words, the MsgA preamble and the MsgA data may be retransmitted by the same counter and step size.

For example, based on the configured initial PUSCH power, retransmission may be performed with PUSCH transmission power+(RampingCounter−1)*PUSCH_rampingstep.

In this case, RampingCounter may be the same value as the preamble retransmission counter, and PUSCH_rampingstep may be the same as or different from the ramping step of the preamble. When the PUSCH_rampingstep is different from the ramping step of the preamble, the UE may configure or may be configured with/as the ramping step size for the preamble and the ramping step size for the PUSCH separately. In this case, the range may be the same as or different from the step size of the preamble.

FIG. 14 is a flowchart for explaining an operation method of a UE proposed in the present disclosure.

Referring to FIG. 14, first, a UE (1000/2000 in FIGS. 16 to 20) may receive configuration information including a first power ramping step for a two-step random access channel (RACH) and a second power ramping step for a four-step RACH from a base station (S1401). In other words, the power ramping step for the 2-step RACH may be configured separately from the power ramping step for the 4-step RACH.

For example, the operation of the UE receiving the configuration information in step S1401 may be implemented by an apparatus of FIGS. 16 to 20 to be described below. For example, referring to FIG. 17, one or more processors 1020 may control one or more memories 1040 and/or one or more RF units 1060, etc. to receive configuration information, and the one or more RF units 1060 may receive the configuration information.

Next, the UE (1000/2000 in FIGS. 16 to 20) may transmit information (e.g. the MsgA) including a first preamble and a physical uplink shared channel (PUSCH) (e.g. Msg3) for the two-step RACH to the base station based on the first power ramping step (S1402). For example, the PUSCH may include a UE ID (e.g. IMSI, TIMSI, etc.) and a connection request.

In this case, the PUSCH may be transmitted using the same power ramping step and/or power ramping counter as the first preamble. For example, when the first preamble is transmitted with a power ramping counter value of 1 and a power ramping step value of 4 dB, the PUSCH may also be transmitted with the power ramping counter value of 1 and the power ramping step value of 4 dB.

For example, the operation of the UE transmitting the information in step S1402 may be implemented by the apparatus of FIGS. 16 to 20 to be described below. For example, referring to FIG. 17, one or more processors 1020 may control one or more memories 1040 and/or one or more RF units 1060, etc. to transmit the information, and the one or more RF units 1060 may transmit the information.

Next, the UE (1000/2000 in FIGS. 16 to 20), based on the number of retransmission of information exceeding a preconfigured maximum number (e.g. Preamble2stepTransMax) of retransmission related to the two-step RACH, may transmit a second preamble for the four-step RACH to the base station using the second power ramping step (S1403). In other words, when the number of retransmissions of information exceeds the preconfigured maximum number of retransmissions related to the two-step RACH, the UE may convert from the 2-step RACH operation (or, procedure) to the 4-step RACH operation and transmit the second preamble to the base station using the second power ramping step. Through this, the UE and/or the base station can implement a low-delay and high-reliability communication system, as well as increase the power efficiency in the random access procedure.

For example, a size of the first power ramping step may be different from a size of the second power ramping step. For example, the preconfigured maximum number of retransmission (e.g. Preamble2stepTransMax) related to the two-step RACH may be smaller than a maximum number of retransmission (e.g. PreambleTransMax) related to the four-step RACH. And/or, the configuration information may include the maximum number of retransmission related to the 2-step RACH and the maximum number of retransmission related to the 4-step RACH.

And/or, the number of retransmission of the second preamble may be counted in addition to the number of retransmission of the information. For example, when the retransmission of the information corresponds to the maximum number of retransmission related to the 2-step RACH of 3, the UE may convert (or fall back) to the 4-step RACH operation to transmit the second preamble, and in this case, when the second preamble is also retransmitted, the UE may count the number of retransmissions of the second preamble from three.

For example, the operation of the UE transmitting the second preamble in step S1403 may be implemented by the apparatus of FIGS. 16 to 20 to be described below. For example, referring to FIG. 17, one or more processors 1020 may control one or more memories 1040 and/or one or more RF units 1060, etc. to transmit the second preamble, and the one or more RF units 1060 may transmit the second preamble.

Since the operation of the UE described with reference to FIG. 14 is the same as that of the UE described with reference to FIGS. 1 to 13 (e.g. the first to second embodiments), a detailed description other than that is omitted.

The above-described signaling and operation may be implemented by the apparatus (e.g. FIGS. 16 to 20) to be described below. For example, the above-described signaling and operation may be processed by one or more processors 1010 and 2020 of FIGS. 16 to 20, and the above-described signaling and operation may be stored in a memory (example: 1040, 2040) in the form of an instruction/program (e.g. instruction, executable code) for driving at least one processor (example: 1010, 2020) of FIGS. 16 to 20.

For example, an apparatus comprising one or more memories and one or more processors functionally connected to the one or more memories, wherein the one or more processors may be configured to cause the apparatus to receive configuration information including a first power ramping step for a two-step random access channel (RACH) and a second power ramping step for a four-step RACH from a base station, transmit information including a first preamble and a physical uplink shared channel (PUSCH) for the two-step RACH to the base station based on the first power ramping step, and based on a number of retransmission of the information exceeding a preconfigured maximum number of retransmission related to the two-step RACH, transmit a second preamble for the four-step RACH to the base station using the second power ramping step.

As another example, A non-transitory computer readable medium (CRM) storing one or more instructions, wherein the one or more instructions, that are executable by one or more processors, may cause a user equipment (UE) to receive configuration information including a first power ramping step for a two-step random access channel (RACH) and a second power ramping step for a four-step RACH from a base station, transmit information including a first preamble and a physical uplink shared channel (PUSCH) for the two-step RACH to the base station based on the first power ramping step, and based on a number of retransmission of the information exceeding a preconfigured maximum number of retransmission related to the two-step RACH, transmit a second preamble for the four-step RACH to the base station using the second power ramping step.

FIG. 15 is a flowchart for explaining an operation method of a base station proposed in the present disclosure.

Referring to FIG. 15, first, a base station (1000/2000 in FIGS. 16 to 20) may transmit configuration information including a first power ramping step for a two-step random access channel (RACH) and a second power ramping step for a four-step RACH to a UE (S1501). In other words, the power ramping step for the 2-step RACH may be configured separately from the power ramping step for the 4-step RACH.

For example, the operation of the base station transmitting the configuration information in step S1501 may be implemented by an apparatus of FIGS. 16 to 20 to be described below. For example, referring to FIG. 17, one or more processors 1020 may control one or more memories 1040 and/or one or more RF units 1060, etc. to receive configuration information, and the one or more RF units 1060 may transmit the configuration information.

Next, the base station (1000/2000 in FIGS. 16 to 20) may receive information (e.g. the MsgA) including a first preamble and a physical uplink shared channel (PUSCH) (e.g. Msg3) for the two-step RACH from the UE based on the first power ramping step (S1502). For example, the PUSCH may include a UE ID (e.g. IMSI, TIMSI, etc.) and a connection request.

In this case, the PUSCH may be transmitted using the same power ramping step and/or power ramping counter as the first preamble. For example, when the first preamble is transmitted with a power ramping counter value of 1 and a power ramping step value of 4 dB, the PUSCH may also be transmitted with the power ramping counter value of 1 and the power ramping step value of 4 dB.

For example, the operation of the base station receiving the information in step S1502 may be implemented by the apparatus of FIGS. 16 to 20 to be described below. For example, referring to FIG. 17, one or more processors 1020 may control one or more memories 1040 and/or one or more RF units 1060, etc. to transmit the information, and the one or more RF units 1060 may receive the information.

Next, the base station (1000/2000 in FIGS. 16 to 20), based on the number of retransmission of information exceeding a preconfigured maximum number (e.g. Preamble2stepTransMax) of retransmission related to the two-step RACH, may receive a second preamble for the four-step RACH from the UE using the second power ramping step (S1503). In other words, when the number of retransmissions of information exceeds the preconfigured maximum number of retransmissions related to the two-step RACH, the UE may convert from the 2-step RACH operation (or, procedure) to the 4-step RACH operation and transmit the second preamble to the base station using the second power ramping step. Through this, the UE and/or the base station can implement a low-delay and high-reliability communication system, as well as increase the power efficiency in the random access procedure.

For example, a size of the first power ramping step may be different from a size of the second power ramping step. For example, the preconfigured maximum number of retransmission (e.g. Preamble2stepTransMax) related to the two-step RACH may be smaller than a maximum number of retransmission (e.g. PreambleTransMax) related to the four-step RACH. And/or, the configuration information may include the maximum number of retransmission related to the 2-step RACH and the maximum number of retransmission related to the 4-step RACH.

And/or, the number of retransmission of the second preamble may be counted in addition to the number of retransmission of the information. For example, when the retransmission of the information corresponds to the maximum number of retransmission related to the 2-step RACH of 3, the UE may convert (or fall back) to the 4-step RACH operation to transmit the second preamble, and in this case, when the second preamble is also retransmitted, the UE may count the number of retransmissions of the second preamble from three.

For example, the operation of the base station receiving the second preamble in step S1503 may be implemented by the apparatus of FIGS. 16 to 20 to be described below. For example, referring to FIG. 17, one or more processors 1020 may control one or more memories 1040 and/or one or more RF units 1060, etc. to transmit the second preamble, and the one or more RF units 1060 may receive the second preamble.

Since the operation of the base station described with reference to FIG. 15 is the same as that of the base station described with reference to FIGS. 1 to 14 (e.g. the first to second embodiments), a detailed description other than that is omitted.

The above-described signaling and operation may be implemented by the apparatus (e.g. FIGS. 16 to 20) to be described below. For example, the above-described signaling and operation may be processed by one or more processors 1010 and 2020 of FIGS. 16 to 20, and the above-described signaling and operation may be stored in a memory (example: 1040, 2040) in the form of an instruction/program (e.g. instruction, executable code) for driving at least one processor (example: 1010, 2020) of FIGS. 16 to 20.

For example, an apparatus comprising one or more memories and one or more processors functionally connected to the one or more memories, wherein the one or more processors may be configured to cause the apparatus to transmit configuration information including a first power ramping step for a two-step random access channel (RACH) and a second power ramping step for a four-step RACH to a UE, receive information including a first preamble and a physical uplink shared channel (PUSCH) for the two-step RACH from the UE based on the first power ramping step, and based on a number of retransmission of the information exceeding a preconfigured maximum number of retransmission related to the two-step RACH, receive a second preamble for the four-step RACH from the UE using the second power ramping step.

As another example, A non-transitory computer readable medium (CRM) storing one or more instructions, wherein the one or more instructions, that are executable by one or more processors, may cause a base station to transmit configuration information including a first power ramping step for a two-step random access channel (RACH) and a second power ramping step for a four-step RACH to a UE, receive information including a first preamble and a physical uplink shared channel (PUSCH) for the two-step RACH from the UE based on the first power ramping step, and based on a number of retransmission of the information exceeding a preconfigured maximum number of retransmission related to the two-step RACH, receive a second preamble for the four-step RACH from the UE using the second power ramping step.

Example of Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 16 illustrates a communication system 10 applied to the present disclosure.

Referring to FIG. 16, a communication system (1) applied to the present disclosure includes wireless devices, base stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 1000a, vehicles 1000b-1 and 1000b-2, an eXtended Reality (XR) device 1000c, a hand-held device 1000d, a home appliance 1000e, an Internet of Things (IoT) device 1000f, and an Artificial Intelligence (AI) device/server 4000. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The handheld device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 2000a may operate as a BS/network node with respect to other wireless devices.

The wireless devices 1000a to 1000f may be connected to the network 3000 via the BSs 2000. An AI technology may be applied to the wireless devices 1000a to 1000f and the wireless devices 1000a to 1000f may be connected to the AI server 4000 via the network 3000. The network 3000 may be configured using a 3G network, a 4G (e.g., LTE) network, or a 5G (e.g., NR) network. Although the wireless devices 1000a to 1000f may communicate with each other through the BSs 2000/network 3000, the wireless devices 1000a to 1000f may perform direct communication (e.g., sidelink communication) with each other without passing through the BSs/network. For example, the vehicles 1000b-1 and 1000b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 1000a to 1000f.

Wireless communication/connections 1500a, 1500b, or 1500c may be established between the wireless devices 1000a to 1000f/BS 2000, or BS 2000/BS 2000. Herein, the wireless communication/connections may be established through various RATs (e.g., 5G NR) such as uplink/downlink communication 1500a, sidelink communication 1500b (or, D2D communication), or inter BS communication 1500c (e.g. Relay, Integrated Access Backhaul(IAB)). The wireless devices and the BSs/the wireless devices, the BSs and the BSs may transmit/receive radio signals to/from each other through the wireless communication/connections 1500a, 1500b, and 1500c. For example, the wireless communication/connections 1500a, 1500b, and 1500c may transmit/receive signals through various physical channels. To this end, at least a part of various configuration information configuring processes, various signal processing processes (e.g., channel encoding/decoding, modulation/ demodulation, and resource mapping/demapping), and resource allocating processes, for transmitting/receiving radio signals, may be performed based on the various proposals of the present disclosure.

Example of Wireless Devices Applicable to the Present Disclosure

FIG. 17 illustrates wireless devices applicable to the present disclosure.

Referring to FIG. 17, a first wireless device 1000 and a second wireless device 2000 may transmit radio signals through a variety of RATs (e.g., LTE and NR). Herein, {the first wireless device 1000 and the second wireless device 2000} may correspond to {the wireless device 1000x and the BS 2000} and/or {the wireless device 1000x and the wireless device 1000x} of FIG. 32.

The first wireless device 1000 may include one or more processors 1020 and one or more memories 1040 and additionally further include one or more transceivers 1060 and/or one or more antennas 1080. The processor(s) 1020 may control the memory(s) 1040 and/or the transceiver(s) 1060 and may be configured to implement the descriptions, functions, procedures, proposals, methods, and/or operational flowcharts disclosed in this document. For example, the processor(s) 1020 may process information within the memory(s) 1040 to generate first information/signals and then transmit radio signals including the first information/signals through the transceiver(s) 1060. The processor(s) 1020 may receive radio signals including second information/signals through the transceiver 1060 and then store information obtained by processing the second information/signals in the memory(s) 1040. The memory(s) 1040 may be connected to the processor(s) 1020 and may store a variety of information related to operations of the processor(s) 1020. For example, the memory(s) 1040 may store software code including commands for performing a part or the entirety of processes controlled by the processor(s) 1020 or for performing the descriptions, functions, procedures, proposals, methods, and/or operational flowcharts disclosed in this document. Herein, the processor(s) 1020 and the memory(s) 1040 may be a part of a communication modem/circuit/chip designed to implement RAT (e.g., LTE or NR). The transceiver(s) 1060 may be connected to the processor(s) 1020 and transmit and/or receive radio signals through one or more antennas 1080. Each of the transceiver(s) 1060 may include a transmitter and/or a receiver. The transceiver(s) 1060 may be interchangeably used with Radio Frequency (RF) unit(s). In the present disclosure, the wireless device may represent a communication modem/circuit/chip.

The second wireless device 2000 may include at least one processor 2020 and at least one memory 2040 and additionally further include at least one transceiver 2060 and/or one or more antennas 2080. The processor(s) 2020 may control the memory(s) 2040 and/or the transceiver(s) 2060 and may be configured to implement the descriptions, functions, procedures, proposals, methods, and/or operational flowcharts disclosed in this document. For example, the processor(s) 2020 may process information within the memory(s) 2040 to generate third information/signals and then transmit radio signals including the third information/signals through the transceiver(s) 2060. The processor(s) 2020 may receive radio signals including fourth information/signals through the transceiver(s) 2060 and then store information obtained by processing the fourth information/signals in the memory(s) 2040. The memory(s) 2040 may be connected to the processor(s) 2020 and may store a variety of information related to operations of the processor(s) 2020. For example, the memory(s) 2040 may store software code including commands for performing a part or the entirety of processes controlled by the processor(s) 2020 or for performing the descriptions, functions, procedures, proposals, methods, and/or operational flowcharts disclosed in this document. Herein, the processor(s) 2020 and the memory(s) 2040 may be a part of a communication modem/circuit/chip designed to implement RAT (e.g., LTE or NR). The transceiver(s) 2060 may be connected to the processor(s) 2020 and transmit and/or receive radio signals through one or more antennas 2080. Each of the transceiver(s) 2060 may include a transmitter and/or a receiver. The transceiver(s) 2060 may be interchangeably used with RF unit(s). In the present disclosure, the wireless device may represent a communication modem/circuit/chip.

Hereinafter, hardware elements of the wireless devices 1000 and 2000 will be described more specifically. One or more protocol layers may be implemented by, without being limited to, one or more processors 1020 and 2020. For example, the one or more processors 1020 and 2020 may implement one or more layers (e.g., functional layers such as PHY, MAC, RLC, PDCP, RRC, and SDAP). The one or more processors 1020 and 2020 may generate one or more Protocol Data Units (PDUs) and/or one or more Service Data Unit (SDUs) according to the descriptions, functions, procedures, proposals, methods, and/or operational flowcharts disclosed in this document. The one or more processors 1020 and 2020 may generate messages, control information, data, or information according to the descriptions, functions, procedures, proposals, methods, and/or operational flowcharts disclosed in this document. The one or more processors 1020 and 2020 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 1060 and 2060. The one or more processors 1020 and 2020 may receive the signals (e.g., baseband signals) from the one or more transceivers 1060 and 2060 and acquire the PDUs, SDUs, messages, control information, data, or information according to the descriptions, functions, procedures, proposals, methods, and/or operational flowcharts disclosed in this document.

The one or more processors 1020 and 2020 may be referred to as controllers, microcontrollers, microprocessors, or microcomputers. The one or more processors 1020 and 2020 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 1020 and 2020. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 1020 and 2020 or stored in the one or more memories 1040 and 2040 so as to be driven by the one or more processors 1020 and 2020. The descriptions, functions, procedures, proposals, methods, and/or operational flowcharts disclosed in this document may be implemented using firmware or software in the form of code, commands, and/or a set of commands.

The one or more memories 1040 and 2040 may be connected to the one or more processors 1020 and 2020 and store various types of data, signals, messages, information, programs, code, instructions, and/or commands. The one or more memories 1040 and 2040 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 1040 and 2040 may be located at the interior and/or exterior of the one or more processors 1020 and 2020. The one or more memories 1040 and 2040 may be connected to the one or more processors 1020 and 2020 through various technologies such as wired or wireless connection.

The one or more transceivers 1060 and 2060 may transmit user data, control information, and/or radio signals/channels, mentioned in the methods and/or operational flowcharts of this document, to one or more other devices. The one or more transceivers 1060 and 2060 may receive user data, control information, and/or radio signals/channels, mentioned in the descriptions, functions, procedures, proposals, methods, and/or operational flowcharts disclosed in this document, from one or more other devices. For example, the one or more transceivers 1060 and 2060 may be connected to the one or more processors 1020 and 2020 and transmit and receive radio signals. For example, the one or more processors 1020 and 2020 may perform control so that the one or more transceivers 1060 and 2060 may transmit user data, control information, or radio signals to one or more other devices. The one or more processors 1020 and 2020 may perform control so that the one or more transceivers 1060 and 2060 may receive user data, control information, or radio signals from one or more other devices. The one or more transceivers 1060 and 2060 may be connected to the one or more antennas 1080 and 2080 and the one or more transceivers 1060 and 2060 may be configured to transmit and receive user data, control information, and/or radio signals/channels, mentioned in the descriptions, functions, procedures, proposals, methods, and/or operational flowcharts disclosed in this document, through the one or more antennas 1080 and 2080. In this document, the one or more antennas may be a plurality of physical antennas or a plurality of logical antennas (e.g., antenna ports). The one or more transceivers 1060 and 2060 may convert received radio signals/channels etc. from RF band signals into baseband signals in order to process received user data, control information, radio signals/channels, etc. using the one or more processors 1020 and 2020. The one or more transceivers 1060 and 2060 may convert the user data, control information, radio signals/channels, etc. processed using the one or more processors 1020 and 2020 from the base band signals into the RF band signals. To this end, the one or more transceivers 1060 and 2060 may include (analog) oscillators and/or filters.

Example of Signal Processing Circuit to which Present Disclosure is Applied

FIG. 18 illustrates a signal processing circuit for a transmit signal.

Referring to FIG. 18, a signal processing circuit 10000 may include a scrambler 10100, a modulator 10200, a layer mapper 10300, a precoder 10400, a resource mapper 10500, and a signal generator 10600. Although not limited thereto, an operation/function of FIG. 23 may be performed by the processors 1020 and 2020 and/or the transceivers 1060 and 2060 of FIG. 18. Hardware elements of FIG. 18 may be implemented in the processors 1020 and 2020 and/or the transceivers 1060 and 2060 of FIG. 17. For example, blocks 10100 to 10600 may be implemented in the processors 1020 and 2020 of FIG. 17. Further, blocks 10100 to 10500 may be implemented in the processors 1020 and 2020 of FIG. 17 and the block 10600 may be implemented in the transceivers 1060 and 2060 of FIG. 17.

A codeword may be transformed into a radio signal via the signal processing circuit 10000 of FIG. 18. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 10100. A scramble sequence used for scrambling may be generated based on an initialization value and the initialization value may include ID information of a wireless device. The scrambled bit sequence may be modulated into a modulated symbol sequence by the modulator 10200. A modulation scheme may include pi/2-BPSK(pi/2-Binary Phase Shift Keying), m-PSK(m-Phase Shift Keying), m-QAM(m-Quadrature Amplitude Modulation), etc. A complex modulated symbol sequence may be mapped to one or more transport layers by the layer mapper 10300. Modulated symbols of each transport layer may be mapped to a corresponding antenna port(s) by the precoder 10400 (precoding). Output z of the precoder 10400 may be obtained by multiplying output y of the layer mapper 10300 by precoding matrix W of N*M. Here, N represents the number of antenna ports and M represents the number of transport layers. Here, the precoder 10400 may perform precoding after performing transform precoding (e.g., DFT transform) for complex modulated symbols. Further, the precoder 10400 may perform the precoding without performing the transform precoding.

The resource mapper 10500 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 10600 may generate the radio signal from the mapped modulated symbols and the generated radio signal may be transmitted to another device through each antenna. To this end, the signal generator 10600 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (10100 to 10600) of FIG. 23. For example, the wireless device (e.g., 1000 or 2000 of FIG. 22) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource de-mapper process, a postcoding process, a demodulation process, and a de-scrambling process. The codeword may be reconstructed into an original information block via decoding. Accordingly, a signal processing circuit (not illustrated)

for the receive signal may include a signal reconstructer, a resource demapper, a postcoder, a demodulator, a descrambler, and a decoder.

Example of a Wireless Device Applied to the Present Disclosure

FIG. 19 illustrates another example of a wireless device applied to the present disclosure.

The wireless device may be implemented in various forms according to a use-case/service (refer to FIG. 21). Referring to FIG. 19, wireless devices 1000 and 2000 may correspond to the wireless devices 1000 and 2000 of FIG. 17 and may be configured by various elements, components, units/portions, and/or modules. For example, each of the wireless devices 1000 and 2000 may include a communication unit 1100, a control unit 1200, a memory unit 1300, and additional components 1400. The communication unit may include a communication circuit 1120 and transceiver(s) 1140. For example, the communication circuit 1120 may include the one or more processors 1020 and 2020 and/or the one or more memories 1040 and 2040 of FIG. 17. For example, the transceiver(s) 1140 may include the one or more transceivers 1060 and 2060 and/or the one or more antennas 1080 and 2080 of FIG. 17. The control unit 1200 is electrically connected to the communication unit 1100, the memory 1300, and the additional components 1400 and controls overall operation of the wireless devices. For example, the control unit 1200 may control an electric/mechanical operation of the wireless device based on programs/code/commands/information stored in the memory unit 1300. The control unit 1200 may transmit the information stored in the memory unit 1300 to the exterior (e.g., other communication devices) via the communication unit 1100 through a wireless/wired interface or store, in the memory unit 1300, information received through the wireless/wired interface from the exterior (e.g., other communication devices) via the communication unit 1100.

The additional components 1400 may be variously configured according to types of wireless devices. For example, the additional components 1400 may include at least one of a power unit/battery, input/output (I/O) unit, a driving unit, and a computing unit. The wireless device may be implemented in the form of, without being limited to, the robot (1000a of FIG. 16), the vehicles (1000b-1 and 1000b-2 of FIG. 16), the XR device (1000c of FIG. 16), the hand-held device (1000d of FIG. 16), the home appliance (1000e of FIG. 16), the IoT device (1000f of FIG. 16), a digital broadcast terminal, a hologram device, a public safety device, an MTC device, a medicine device, a fintech device (or a finance device), a security device, a climate/environment device, the AI server/device (4000 of FIG. 16), the BSs (2000 of FIG. 16), a network node, etc. The wireless device may be used in a mobile or fixed place according to a use-example/service.

In FIG. 19, the entirety of the various elements, components, units/portions, and/or modules in the wireless devices 1000 and 2000 may be connected to each other through a wired interface or at least a part thereof may be wirelessly connected through the communication unit 1100. For example, in each of the wireless devices 1000 and 2000, the control unit 1200 and the communication unit 1100 may be connected by wire and the control unit 1200 and first units (e.g., 1300 and 1400) may be wirelessly connected through the communication unit 1100. Each element, component, unit/portion, and/or module within the wireless devices 1000 and 2000 may further include one or more elements. For example, the control unit 1200 may be configured by a set of one or more processors. As an example, the control unit 1200 may be configured by a set of a communication control processor, an application processor, an Electronic Control Unit (ECU), a graphical processing unit, and a memory control processor. As another example, the memory 1300 may be configured by a Random Access Memory (RAM), a Dynamic RAM (DRAM), a Read Only Memory (ROM)), a flash memory, a volatile memory, a non-volatile memory, and/or a combination thereof.

FIG. 20 illustrates a portable device applied to the present disclosure.

The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 20, a portable device 1000 may include an antenna unit 1080, a communication unit 1100, a control unit 1200, a memory unit 1300, a power supply unit 1400a, an interface unit 1400b, and an input/output unit 1400c. The antenna unit 1080 may be configured as a part of the communication unit 1100. The blocks 1100 to 1300/1400a to 1400c correspond to the blocks 1100 to 1300/1400 of FIG. 19, respectively.

The communication unit 1100 may transmit/receive a signal (e.g., data, a control signal, etc.) to/from another wireless device and eNBs. The control unit 1200 may perform various operations by controlling components of the portable device 1000. The control unit 1200 may include an Application Processor (AP). The memory unit 1300 may store data/parameters/programs/codes/instructions required for driving the portable device 1000. Further, the memory unit 1300 may store input/output data/information, etc. The power supply unit 1400a may supply power to the portable device 1000 and include a wired/wireless charging circuit, a battery, and the like. The interface unit 1400b may support a connection between the portable device 1000 and another external device. The interface unit 1400b may include various ports (e.g., an audio input/output port, a video input/output port) for the connection with the external device. The input/output unit 1400c may receive or output a video information/signal, an audio information/signal, data, and/or information input from a user. The input/output unit 1400c may include a camera, a microphone, a user input unit, a display unit 1400d, a speaker, and/or a haptic module.

As one example, in the case of data communication, the input/output unit 1400c may acquire information/signal (e.g., touch, text, voice, image, and video) input from the user and the acquired information/signal may be stored in the memory unit 1300. The communication unit 1100 may transform the information/signal stored in the memory into the radio signal and directly transmit the transformed radio signal to another wireless device or transmit the radio signal to the base station. Further, the communication unit 1100 may receive the radio signal from another wireless device or base station and then reconstruct the received radio signal into original information/signal. The reconstructed information/signal may be stored in the memory unit 1300 and then output in various forms (e.g., text, voice, image, video, haptic) through the input/output unit 1400c.

The embodiments described above are implemented by combinations of components and features of the present disclosure in predetermined forms. Each component or feature should be considered selectively unless specified separately. Each component or feature may be carried out without being combined with another component or feature.

Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent to constitute an embodiment by combining claims that are not explicitly cited in the claims or to be included as a new claim by amendment after filing.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although a method for transmitting and receiving preamble in a wireless communication system of the present disclosure has been described with reference to an example applied to a 3GPP LTE/LTE-A system or a 5G system (New RAT system), the method may be applied to various wireless communication systems in addition to the 3GPP LTE/LTE-A system or 5G system.

The invention claimed is:

1. A method of transmitting, by a user equipment (UE), a physical random access channel (PRACH) preamble in a wireless communication system, the method comprising:
receiving configuration information including a first power ramping step for a two-step random access channel (RACH) and a second power ramping step for a four-step RACH from a base station;
transmitting information including a first preamble and a physical uplink shared channel (PUSCH) for the two-step RACH to the base station based on the first power ramping step; and
based on a number of retransmissions of the information exceeding a preconfigured maximum number of retransmissions related to the two-step RACH, transmitting a second preamble for the four-step RACH to the base station using the second power ramping step, in case of switching from the two-step RACH to the four-step RACH, a difference in power between a first power for transmitting the first preamble and a second power for transmitting the second preamble is determined based on (PREAMBLE POWER RAMPING COUNTER−1)*(the first power ramping step−the second power ramping step),
wherein, the PREAMBLE POWER RAMPING COUNTER is incremented by 1 based on a number of transmissions of the first preamble and the second preamble.

2. The method of claim 1, wherein a size of the first power ramping step is different from a size of the second power ramping step.

3. The method of claim 1, wherein the preconfigured maximum number of retransmissions related to the two-step RACH is smaller than a maximum number of retransmissions related to the four-step RACH.

4. The method of claim 1, wherein a number of retransmissions of the second preamble is counted in addition to the number of retransmissions of the information.

5. The method of claim 1, wherein the PUSCH is transmitted using the same power ramping step and power ramping counter as the first preamble.

6. The method of claim 5, wherein the PUSCH includes a UE ID and a connection request.

7. A user equipment (UE) transmitting a physical random access channel (PRACH) preamble in a wireless communication system, the UE comprising:
one or more transceivers;
one or more processors; and
one or more memories functionally connected to the one or more processors, and storing instructions for performing operations,
wherein the operations includes:
receiving configuration information including a first power ramping step for a two-step random access channel (RACH) and a second power ramping step for a four-step RACH from a base station;
transmitting information including a first preamble and a physical uplink shared channel (PUSCH) for the two-step RACH to the base station based on the first power ramping step; and
based on a number of retransmissions of the information exceeding a preconfigured maximum number of retransmissions related to the two-step RACH, transmitting a second preamble for the four-step RACH to the base station using the second power ramping step,
in case of switching from the two-step RACH to the four-step RACH, a difference in power between a first power for transmitting the first preamble and a second power for transmitting the second preamble is determined based on (PREAMBLE POWER RAMPING COUNTER −1)*(the first power ramping step−the second power ramping step),
wherein, the PREAMBLE POWER RAMPING COUNTER is incremented by 1 based on a number of transmissions of the first preamble and the second preamble.

8. The UE of claim 7, wherein a size of the first power ramping step is different from a size of the second power ramping step.

9. The UE of claim 7, wherein the preconfigured maximum number of retransmissions related to the two-step RACH is smaller than a maximum number of retransmissions related to the four-step RACH.

10. The UE of claim 7, wherein a number of retransmissions of the second preamble is counted in addition to the number of retransmissions of the information.

11. The UE of claim 7, wherein the PUSCH is transmitted using the same power ramping step and power ramping counter as the first preamble.

12. The UE of claim 11, wherein the PUSCH includes a UE ID and a connection request.

13. An apparatus comprising one or more memories and one or more processors functionally connected to the one or more memories,
- wherein the one or more processors is configured to cause the apparatus to:
- receive configuration information including a first power ramping step for a two-step random access channel (RACH) and a second power ramping step for a four-step RACH from a base station,
- transmit information including a first preamble and a physical uplink shared channel (PUSCH) for the two-step RACH to the base station based on the first power ramping step, and
- based on a number of retransmissions of the information exceeding a preconfigured maximum number of retransmissions related to the two-step RACH, transmit a second preamble for the four-step RACH to the base station using the second power ramping step,
- in case of switching from the two-step RACH to the four-step RACH, a difference in power between a first power for transmitting the first preamble and a second power for transmitting the second preamble is determined based on (PREAMBLE POWER RAMPING COUNTER−1)*(the first power ramping step−the second power ramping step),
- wherein, the PREAMBLE POWER RAMPING COUNTER is incremented by 1 based on a number of transmissions of the first preamble and the second preamble.

14. A non-transitory computer readable medium (CRM) storing one or more instructions,
- wherein the one or more instructions, that are executable by one or more processors, cause a user equipment (UE) to:
- receive configuration information including a first power ramping step for a two-step random access channel (RACH) and a second power ramping step for a four-step RACH from a base station,
- transmit information including a first preamble and a physical uplink shared channel (PUSCH) for the two-step RACH to the base station based on the first power ramping step, and
- based on a number of retransmissions of the information exceeding a preconfigured maximum number of retransmissions related to the two-step RACH, transmit a second preamble for the four-step RACH to the base station using the second power ramping step,
- in case of switching from the two-step RACH to the four-step RACH, a difference in power between a first power for transmitting the first preamble and a second power for transmitting the second preamble is determined based on (PREAMBLE POWER RAMPING COUNTER−1)*(the first power ramping step−the second power ramping step),
- wherein, the PREAMBLE POWER RAMPING COUNTER is incremented by 1 based on a number of transmissions of the first preamble and the second preamble.

15. The method of claim 1, wherein the first preamble and the second preamble are included in a same preamble group.

16. The method of claim 1, wherein the first preamble is the same preamble as the second preamble.

17. The UE of claim 7, wherein the first preamble and the second preamble are included in a same preamble group.

18. The UE of claim 7, w wherein the first preamble is the same preamble as the second preamble.

* * * * *